(12) United States Patent
Bennett et al.

(10) Patent No.: US 9,279,741 B2
(45) Date of Patent: Mar. 8, 2016

(54) METHOD OF MEASURING MULTI-MODE FIBER OPTICAL PROPERTIES DURING PROCESSING OF THE FIBER

(71) Applicant: Corning Incorporated, Corning, NY (US)

(72) Inventors: Kevin Wallace Bennett, Hammondsport, NY (US); Xin Chen, Corning, NY (US); Jason Edward Hurley, Corning, NY (US); Anping Liu, Horseheads, NY (US); Jody Paul Markley, Watkins Glen, NY (US); Joseph Edward McCarthy, Hornell, NY (US); Eric John Mozdy, Horseheads, NY (US)

(73) Assignee: Corning Incorporated, Cornig, NY (US)

( * ) Notice: Subject to any disclaimer, the term of this patent is extended or adjusted under 35 U.S.C. 154(b) by 75 days.

(21) Appl. No.: 14/089,023

(22) Filed: Nov. 25, 2013

(65) Prior Publication Data

US 2014/0226151 A1  Aug. 14, 2014

Related U.S. Application Data

(60) Provisional application No. 61/731,721, filed on Nov. 30, 2012.

(51) Int. Cl.
| | | |
|---|---|---|
| *G01M 11/00* | (2006.01) | |
| *H04B 10/071* | (2013.01) | |
| *H04B 10/077* | (2013.01) | |
| *C03B 37/025* | (2006.01) | |

(52) U.S. Cl.
CPC ........... *G01M 11/30* (2013.01); *C03B 37/0253* (2013.01); *G01M 11/31* (2013.01); *G01M 11/3118* (2013.01); *G01M 11/3163* (2013.01); *G01M 11/33* (2013.01); *G01M 11/338* (2013.01); *G01M 11/35* (2013.01); *H04B 10/071* (2013.01); *H04B 10/0775* (2013.01); *C03B 2205/70* (2013.01)

(58) Field of Classification Search
None
See application file for complete search history.

(56) References Cited

U.S. PATENT DOCUMENTS

| 7,746,454 B2 | 6/2010 | Liang et al. |
| 2011/0289980 A1 | 12/2011 | Filippov et al. |
| 2012/0125053 A1 | 5/2012 | Bookbinder et al. |
| 2014/0092380 A1* | 4/2014 | Chen et al. .................. 356/73.1 |

FOREIGN PATENT DOCUMENTS

EP    1265062    12/2002

OTHER PUBLICATIONS

PCT/US13/072209 Invitation to Pay Additional Fees, Mar. 2014.
(Continued)

*Primary Examiner* — Gordon J Stock, Jr.
(74) *Attorney, Agent, or Firm* — Robert L. Carlson

(57) ABSTRACT

A method of measuring optical properties of a multi-mode optical fiber during processing of the fiber is described. The method includes: transmitting a light signal through one of the draw end of the multi-mode fiber and a test fiber section toward the other of the draw end and the test fiber section; and receiving a portion of the light signal at one of the draw end and the test fiber section. The method also includes obtaining optical data related to the received portion of the light signal; and analyzing the optical data to determine a property of the multi-mode fiber.

25 Claims, 14 Drawing Sheets

(56) References Cited

OTHER PUBLICATIONS

Fiber Reflector: http://www.ozoptics.com/ALLNEW_PDF/DTS0020.pdf, Feb. 2005.

U.S. Appl. No. 14/037,912, filed Sep. 26, 2013.

Corsi et al; "Continuous-Wave Backreflection Measurement of Polarization Mode Dispersion" IEEE Photonics Technology Letters, vol. 11 No. 4; Apr. 1999 pp. 451-453.

Shao et al; "Fiber Bandwidth Measurement Using Pulse Spectrum Analysis"; Applied Optics; vol. 25 No. 7; Apr. 1986; pp. 1069-1071.

* cited by examiner

METHOD OF MEASURING MULTI-MODE FIBER OPTICAL PROPERTIES DURING PROCESSING OF THE FIBER

CROSS-REFERENCE TO RELATED APPLICATIONS

This application claims the benefit of priority under 35 U.S.C. §119 of U.S. Provisional Application Ser. No. 61/731,721, filed on Nov. 30, 2012, the content of which is relied upon and incorporated herein by reference in its entirety.

BACKGROUND

The disclosure generally relates to measuring optical properties of an optical multi-mode fiber (MMF) such as bandwidth and, more particularly, relates to methods and configurations for testing an MMF by signal transmission and receipt during processing of the MMF.

Fiber manufacturing typically involves various types of process feedback, many of which involve measurements of the glass and coatings in situ. These measurements include diameter, geometry, and flaw counts. However, these measurements generally do not relate to optical properties of the fiber core, often the most critical for end product attributes (loss, dispersion, bandwidth, etc.). One significant reason why fiber core properties are not measured to provide fiber manufacturing feedback pertains to the difficulty of accessing the fiber core during processing. For instance, the core is being stretched from a large preform to a hair-thin strand, and factors such as high-temperature, high-speed elongation, and rotation/motion of the fiber end preclude easy access for launching and receiving light from the core.

Fiber core attributes are some of the most important attributes for assessing end-product performance, since the core carries optical signals. Moreover, the core region for multi-mode fibers is typically ~8× larger than the more ubiquitous single mode fibers commonly used in long-distance (many km) optical fiber links, supporting numerous spatial modes (often >100). For this reason, many optical measurement configurations that can be used with single mode fibers encounter additional complexity in implementation and interpretation when applied to multi-mode fibers. For example, meaningful amounts of light must be launched into the larger multi-mode core for adequate signal-to-noise ratios. At the same time, nonlinear effects from high power levels should be avoided, and the proper field localization (i.e., exciting the relevant spatial modes) should be guaranteed in the multi-mode fiber in order to make interpretation of the measurement results accurate.

This goal of accurate measurements is further complicated by the advent of low bend loss fiber profiles, where a refractive index profile feature, such as a trench surrounding the core, dramatically reduces light losses from the core due to bending. This thwarts many known inline coupling techniques since common practices, such as bending the fiber to leak light into a detector, will not be successful.

Bandwidth is one of the most important attributes for MMF products, and is used in the optical fiber industry to set the grade of the MMF product. The bandwidth is directly related to how the refractive index profile of the MMF exists in practice compared to the ideal, optimal profile for a given MMF configuration. The bandwidth exhibited by a given MMF is generally very sensitive to even a slight deviation from the ideal, optimal profile.

Bandwidth is typically measured on cut lengths of optical fiber, after the fiber has been drawn, cut into shipping lengths, and stored on a storage spool. One such method for measuring the bandwidth of an as-produced MMF is to apply a light signal at one end of the MMF, receive the transmitted light signal at the other end, and measure bandwidth through the known, differential mode delay (DMD) measurement technique. The DMD method scans the time delay through a controlled offset launch from a single mode fiber launch condition, and further data processing converts the DMD result into a bandwidth result. The time for each DMD measurement is typically about 5-11 minutes.

SUMMARY

According to one embodiment, a method of measuring a property of a multi-mode optical fiber during processing of the fiber is provided. The method includes the step of drawing a multi-mode fiber from a preform in a manner that increases the length of the fiber as a function of time. The fiber has a draw end, and the preform is optically coupled to a test fiber section. The method further includes the step of transmitting a light signal through one of the draw end or the test fiber section toward the other of the draw end or the test fiber section. The method additionally includes the steps of receiving a portion of the light signal at one of the draw end or the test fiber section, and obtaining optical data related to the received portion of the light signal. The method further includes the step of analyzing the optical data to determine a property of the multi-mode fiber.

According to another embodiment, a method of measuring a property of a multi-mode optical fiber during processing of the fiber is provided. This method includes the step of drawing a multi-mode fiber from a preform in a manner that increases the length of the fiber as a function of time. The method further includes the step of transmitting a light signal through the first into the optical fiber preform and reflecting back from the preform through the multi-mode fiber. The method additionally includes the steps of receiving a portion of the light signal at the first end of the fiber, and obtaining optical data related to the received portion of the light signal. The method further includes the step of analyzing the optical data to determine a property of the multi-mode fiber.

According to a further embodiment, a method of measuring a property of a multi-mode optical fiber during processing of the fiber is provided. This method includes the step of drawing a multi-mode fiber from a preform in a manner that increases the length of the fiber as a function of time. The fiber has a first distal end and a second end which is attached to the preform as it is drawn. The method further includes the step of transmitting a light signal through the first end toward the second end of the fiber. The method additionally includes the steps of extracting a portion of the light signal from the fiber at a point on the fiber in proximity to the second end, preferably prior to entering the fiber preform, receiving the extracted portion of the light signal, and obtaining optical data related to the received portion of the light signal. The method further includes the step of analyzing the optical data to determine a property of the multi-mode fiber.

According to yet another embodiment, a method of preparing a test configuration for measuring a property of a multi-mode optical fiber during processing of the fiber is provided. This method includes the step of drawing a test fiber section in a downward direction to a defined length from a vertically-oriented preform having a first end and a second end. The test fiber section is coupled to the first end of the preform. The method further includes the steps of cooling the preform, rotating the preform such that the first end of the preform is substantially above the second end of the preform, and drawing a multi-mode optical fiber from the second end of the preform in a manner that increases the length of the optical fiber as a function of time. The optical fiber has a draw end. The method additionally includes the steps of transmitting a light signal through one of the draw end and the test fiber section toward the other of the draw end and the test fiber section, receiving a portion of the light signal at one of the draw end and the test fiber section, and obtaining optical data related to the received portion of the light signal. The method further includes the step of analyzing the optical data to determine a property of the multi-mode fiber.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
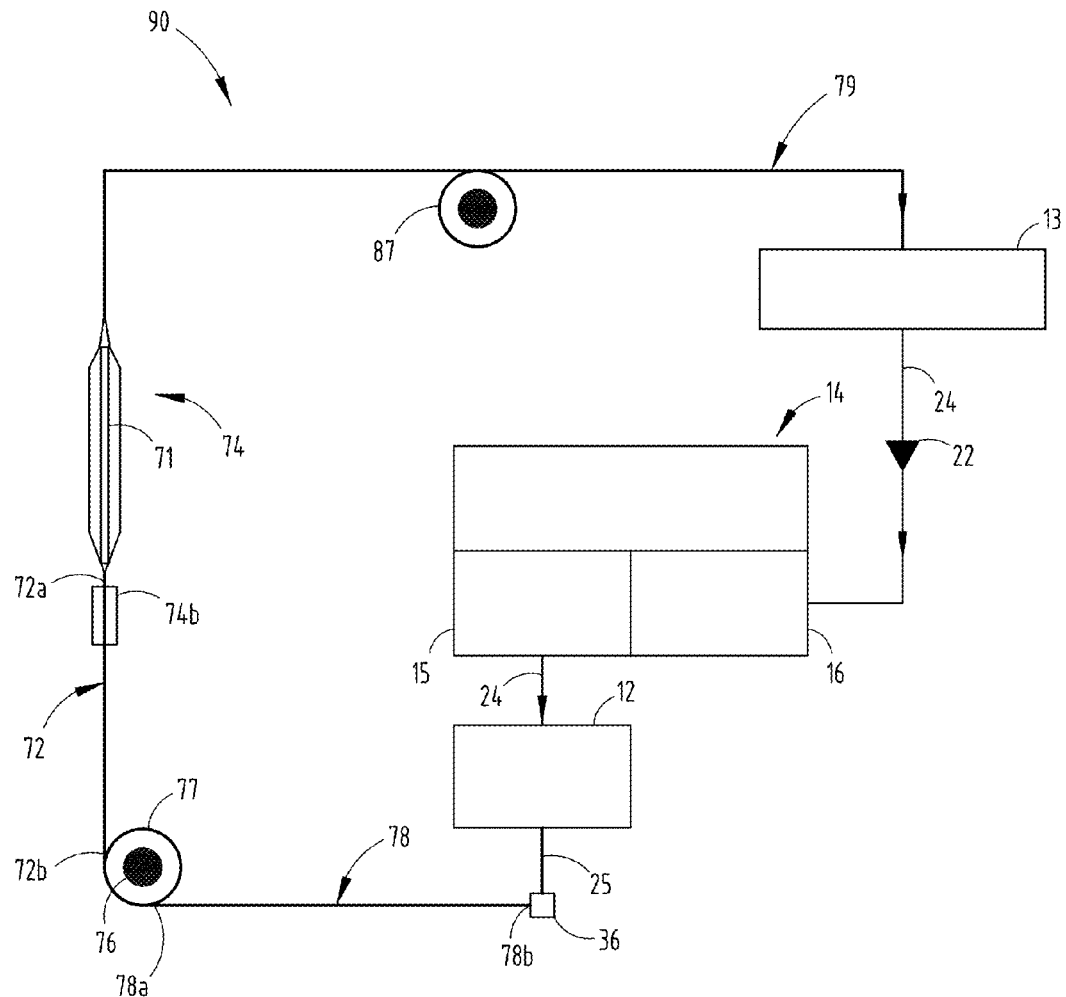
FIG. 1 is a schematic diagram illustrating a single path test configuration for testing the bandwidth of a multi-mode optical fiber with a test signal originating on the draw end of the fiber according to one embodiment.

Reference will now be made in detail to the present preferred embodiments, examples of which are illustrated in the accompanying drawings. Whenever possible, the same reference numerals will be used throughout the drawings to refer to the same or like parts.

As the global need for information and bandwidth continues to climb and new information hubs—such as large data centers—emerge, the need for high-bandwidth, low-loss, bendable multi-mode fiber has grown. Since the advent of low-cost vertical-cavity surface-emitting laser (VCSEL) sources, this need has been renewed as the low-cost VCSEL systems rely on large multi-mode fiber cores utilizing cheap connectors and components for optimal coupling and signal transmission. Ensuring that today's multi-mode fiber enables the high-bandwidth and low-loss system performance however, requires increasingly stringent control of the fiber characteristics, especially the optical performance of the core. In the quest to optimize manufacturing processes to this end, producers require improved feedback on optical performance, preferably live at the time of fiber draw. Optical properties such as loss, dispersion, bend performance, and bandwidth are critical to quality and their immediate, accurate measurement is the aim of this invention.

Optical measurements of interest for multi-mode fibers include loss, chromatic dispersion, loss spectrum, bend loss, and scattering. Loss is typically measured by comparing the strength of a signal vs. the transit length, and can be generalized to loss spectrum by including a plurality of wavelengths in the launched light while distinguishing these different wavelengths at the detector. Chromatic dispersion pertains to the variation in light delay as a function of wavelength, and can be accomplished by numerous phase-sensitive or time-pulsed techniques where signals are launched down the length of the fiber and received light is analyzed for wavelength-dependent time delay at the other end.

However, bandwidth is perhaps the most important quality of multi-mode fiber in advanced systems, and arguably one of the most difficult to measure and specify. For this reason, this measurement is described in the most detail herein. Yet techniques applied to realizing bandwidth measurements during fiber manufacturing are also applicable to the list of other, less complex optical measurements (e.g., loss).

One approach to measure multi-mode fiber (MMF) bandwidth, described in further detail below, is to transmit a modulated test signal through an MMF to generate intensity versus frequency plots. Results from these tests can be compared to measurements made on prior-made MMFs. MMF bandwidth is then determined by identifying the 3 dB drop point in frequency. Measurements are primarily made using test signals at around 850 nm (i.e., the common wavelength for today's multi-mode transmission systems); however, other wavelengths are feasible, including 980 nm, 1060 nm and 1310 nm.

The bandwidth of an MMF can be very sensitive to even slight deviations from the ideal, optimal profile of an MMF. Therefore, it is possible to fine-tune the process parameters associated with manufacturing MMFs during the draw process and improve the overall grade of the fibers during production. For example, draw process parameters related to fiber tension, temperature, draw speed or even fiber diameter all can impact the overall bandwidth of a given fiber. It is therefore particularly advantageous to test the bandwidth of MMFs during processing of the MMFs in real-time, or near real-time, to effect rapid improvements to the grade of the fibers by slight process parameter adjustments.

Figure 2:
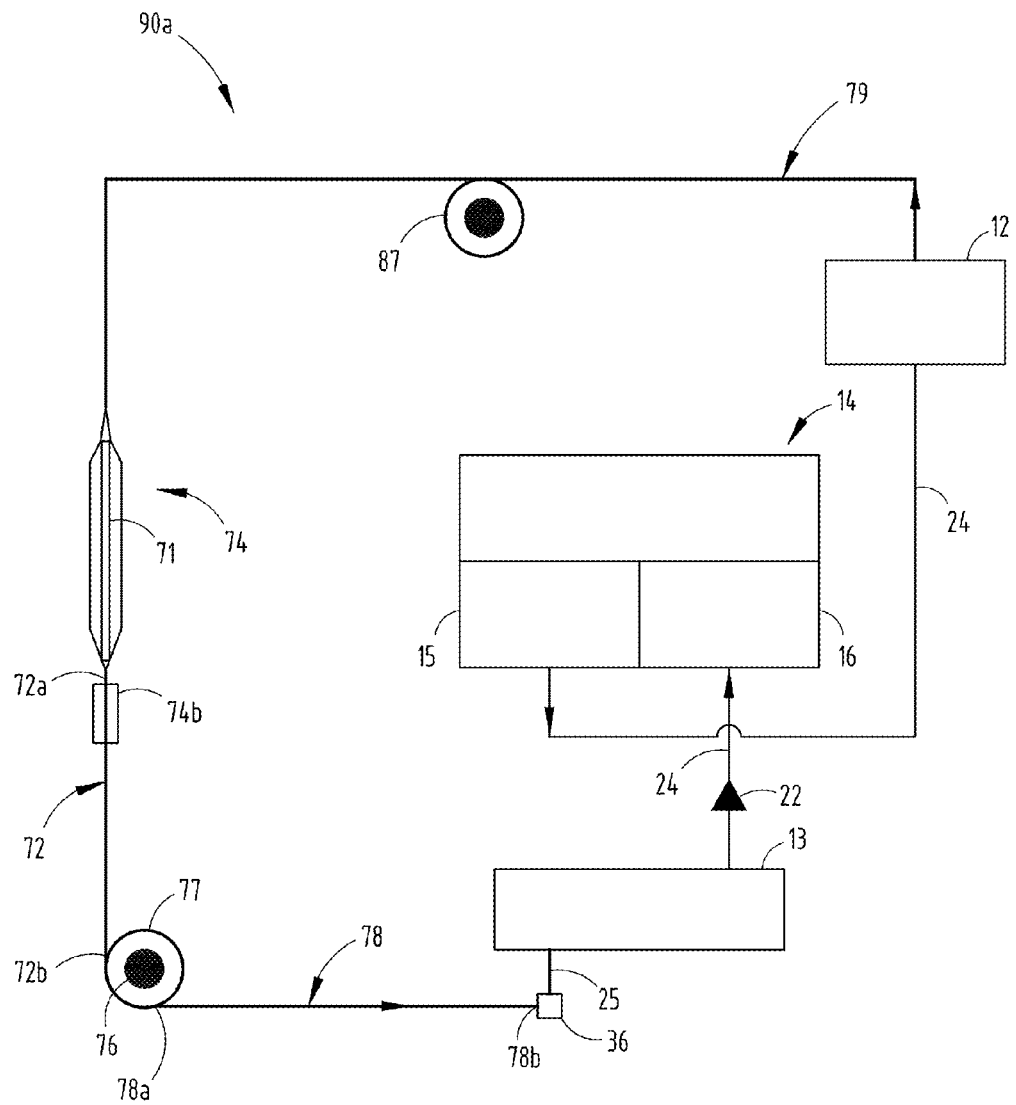
FIG. 2 is a schematic diagram illustrating a single path test configuration for testing the bandwidth of a multi-mode optical fiber with a test signal originating on the preform end of the fiber according to a further embodiment.

The test configurations depicted in FIGS. 1 and 2 can be used to measure the bandwidth of an MMF during processing of the MMF based on a frequency domain approach. The MMF is a bandwidth-limited filter; consequently, higher frequencies used to modulate the transmitter (e.g., transmitter 12) result in increased signal attenuation. Typically, the spectrum generated from a tested MMF follows a (quasi-) Gaussian shape. Hence, the bandwidth of the MMF can be readily retrieved through identifying the frequency when the attenuation of the signal reaches a 3 dB (optical signal) or 6 dB (electrical signal) loss.

In particular, FIGS. 1 and 2 provide two, single path test configurations for online testing (i.e., during fiber manufacturing or other processing) of the bandwidth of an MMF, e.g., optical fiber 72. Both configurations include fiber processing apparatus and the length of the MMF changes as a function of time. Hence, the frequency response of the optical fiber 72 is measured at a given moment for a given fiber length of the optical fiber 72. The bandwidth of optical fiber 72 is calculated by obtaining the frequency value at a certain attenuation level. The test configuration depicted in FIG. 1 relies on a test signal that originates at the second end 78b of the test fiber 78, and test fiber 78 is connected to the optical fiber 72. Conversely, the test configuration depicted in FIG. 2 relies on a test signal that originates from the test fiber 79 (discussed in further detail below).

Exploring the details further, FIG. 1 provides a test configuration 90 for testing the bandwidth of a multi-mode optical fiber 72. As shown, multi-mode optical fiber 72 has a first end 72a (i.e., the preform end) and a second end 72b (i.e., the draw end). Optical fiber 72 also includes a coil 77 of optical fiber wrapped around a fiber support spool 76. The length of the coil of fiber increases as fiber is wound onto the spool during the draw process. Further, optical fiber 72 is optically connected to a test fiber 78. Test fiber 78 includes a first end 78a that is connected to the coil 77. Test fiber 78 also includes a second end 78b that is connected to a fiber coupler 36.

The fiber support spool 76 includes a rotating optical coupler (not shown) that eliminates or minimizes twisting of the optical fiber 72 as it is wound on the spool 76 during processing (e.g., as its length increases). The second end 72b of optical fiber 72 and the first end 78a of test fiber 78 are connected to the rotating optical coupler within spool 76. The rotating optical coupler within spool 76 can be a fiber optic rotary joint (FORJ) device that connects two fiber ends, allowing free rotation between them with minimal optical signal loss. For instance, a PRINCETEL® FORJ, single-channel fiber optic rotary adapter (RFCX series) may be employed as the rotating optical coupler within spool 76. Another rotating optical coupler that can be used with fiber support spool 76 is disclosed in U.S. Pat. No. 7,746,454 (see FIG. 2, element 58 and the corresponding description in the specification), hereby incorporated by reference in this application.

More specifically, the fiber support spool 76 takes up optical fiber 72 as it is processed, forming coil 77. The rotating optical coupler within spool 76 allows test fiber 78 to remain in a constant position at its connection to the fiber coupler 36. As optical fiber 72 is drawn and formed into coil 77, the test fiber 78 remains in a fixed position by virtue of its connection to the rotating optical coupler within spool 76. To the extent fiber support spool 76 cannot accommodate optical fiber 72 after a period of processing in which the length of optical fiber 72 has substantially increased, spool 76 can be removed, and a new spool 76 can be started to facilitate additional testing.

In addition, a fiber cooling device 74b is optionally arranged between the coil 77 and one end of the preform 74. The cooling device can be used to reduce optical losses associated with the portion of the optical fiber 72 (MMF) coming out from the root of preform 74 (i.e., the region of optical fiber 72 near first end 72a) subject to high optical absorption due to the very high temperatures of the draw itself. The cooling device 74*b* can reduce the temperature of the hot fiber by 100-400° C. without significantly altering the attenuation properties of the optical fiber 72. Cooling device 74*b* may be placed in close proximity to the end of the preform 74 that is closest to the first end 72*a* of optical fiber 72.

The test fiber 78 of the optical fiber 72 is coupled to an analog transmitter 12 via fiber coupler 36 and fiber connector 25. Typically, the transmitter 12 employed in optical MMF testing is a VCSEL or a distributed feedback laser (DFB). In addition, a test fiber 79 emanating from an end of preform 74 (e.g., the top of preform 74 as shown in FIG. 1) and core region 71 is connected to detector 13. An optional take-up spool 87 is located between the preform 74 and detector 13 to support the test fiber 79. In addition, the length of optical fiber 72 increases over time during processing as it is formed into coil 77 on fiber support spool 76. The various components used to extend the optical fiber 72 during processing into a long, MMF are known and not shown in FIG. 1.

At the onset of the test, the network analyzer 14 provides a sweeping modulating signal to transmitter 12 via frequency modulation port 15 and cabling 24. An Agilent Technologies, Inc. network analyzer (e.g., Model No. ENA E5071C or PNA N5230C) may be employed for the network analyzer 14. The electric signal is converted into the optical signal through an analog transmitter 12. At the end of the test fiber 79, a detector 13 is attached, which converts the optical signal back into the electrical signal. The electrical signal is then transmitted by further cabling 24 to the detector port 16 of the network analyzer 14. The network analyzer 14 then provides the magnitude of the signal as a function of frequency.

Essentially, the incident light from transmitter 12 within optical fiber 72 is launched through test fiber 78 and into optical fiber 72, then into the molten portion of the fiber 72 in proximity to first end 72*a* with no coating, located between the cooling device 74*b* and preform 74. The test signal light enters the core region 71 and the preform 74, and then continues through the test fiber 79. As the light travels through the core region 71 and preform 74, it remains in a guided form because the preform 74 acts as a waveguide. The light signal then continues through test fiber 79, reaches detector 13, and is processed in the manner described above.

As shown in FIG. 2, the bandwidth of the optical fiber 72 (MMF) can be measured with configuration 90*a* in a manner similar to MMFs measured with configuration 90 (see FIG. 1). In configuration 90*a*, incident light from transmitter 12 can be initially directed through the test fiber 79. The incident light from transmitter 12 originates with the network analyzer 14. Here, analyzer 14 provides a sweeping modulating signal to transmitter 12 via frequency modulation port 15 and cabling 24. The electric signal is converted into the optical signal through an analog transmitter 12.

At this point, the light (i.e., the light originating from transmitter 12 that travels through test fiber 79) then passes through core region 71 and then the molten portion of the optical fiber 72 in proximity to first end 72*a*. Further, the light remains in a guided form because preform 74 acts as a waveguide. Light then continues through optical fiber 72 to the second end 78*b*. The light then continues through coil 77 and then into test fiber 78. The light now reaches coupler 36 and passes through fiber connector 25 into detector 13. There, the detector 13 converts the optical signal back into an electrical signal. The electrical signal is then transmitted by further cabling 24 to the detector port 16 of the network analyzer 14. The network analyzer 14 then provides the magnitude of the signal as a function of frequency. In all other respects the test configuration 90*a* depicted in FIG. 2 is comparable to the configuration 90 depicted in FIG. 1.

The bandwidth measurements performed using configurations 90 and 90*a* are made on optical fiber 72 over a period of time in which more fiber is drawn. Hence, the length of the optical fiber 72 increases during the test. Since transmitter 12 (e.g., a VCESL) launches the light through the center of the optical fiber 72, the bandwidth measured through configuration 90 or 90*a* is more correlated with a "minEMBc" bandwidth. Note that the minEMBc is the lowest bandwidth captured over a set of possible launch conditions. The specific launch condition from a particular transmitter 12 (e.g., a VCSEL) typically yields a bandwidth that is higher than minEMBc. But such a specific launch condition relates to the minEMBc. In the production environment, it is often sufficient to use the measurement result with a single launch condition to judge the MMF quality and provide necessary feedback to the production process.

As noted earlier, the configurations 90 and 90*a* depicted in FIGS. 1 and 2 make use of a single pass testing scheme. Accordingly, the light launched into the optical fiber 72 passes through the fiber only once. For configuration 90, the light passes through optical fiber 72 (and test fiber 78), exits through the top of the preform 74, and then moves through the test fiber 79 into photo detector 13. As for configuration 90*a*, the test signal light passes through test fiber 79, moves through preform 74, exits the bottom of preform 74, moves through the first end 72*a* of the optical fiber 72, and continues through optical fiber 72 to second end 72*b*. The light then passes through coil 77, moves into test fiber 78, and then passes into photo detector 13.

For configurations 90 and 90*a*, a test fiber 79, derived from a portion of the optical fiber 72, may be created that emanates from the top of preform 74. As shown in FIGS. 1 and 2, test fibers 79 and/or 78 connects to detector 13, or transmitter 12, respectively. In one approach, the preform 74 is first drawn to the point that real fiber is produced (e.g., a glass handle integral with preform 74 (not shown) is consumed). It takes a while for the handle to be consumed and reach the real preform 74. The fiber drawing is stopped at approximately the point when the bare fiber reaches a diameter of around 125 microns. The bare fiber is then spliced with a pigtail fiber, becoming test fiber 79. The preform 74 is now cooled, removed, and then reinstalled on the draw tower upside down. At this point, the preform 74 can be further processed to extend an MMF toward the transmitter 12 (see FIG. 1). This MMF becomes optical fiber 72, increasing in length, with second end 72*b* forming coil 77 around spool 76. Test fiber 78 is connected to coil 77 at first end 78*a*, and connected to coupler 36 at second end 78*b*.

At the top of preform 74, the newly produced test fiber 79 (i.e., the fiber produced before preform 74 was reinstalled upside down), is connected with detector 13. Test fiber 79 may be a bare fiber or a coated fiber. A spool 87 is optionally used near the top of the preform 74 to help support the test fiber 79 and curve it down so that additional splicing can be performed, if necessary. In addition, test fiber 79 (in a bare or coated condition) can be spliced with another multi-mode fiber that is, in turn, connected with the photo-detector 13.

Another approach to creating the configurations 90 and 90*a* depicted in FIG. 1 is to alter the existing draw tower in a manner that makes the preform handle (not shown) function as a waveguide. For example, the handle can be made of core cane material with a layer of cladding. As another example, a tapered portion of the preform 74 can be fabricated with a layer of cladding. This preform "portion" can then be coupled to the polished end of the preform handle for repeated use in bandwidth testing.

Figure 1A:
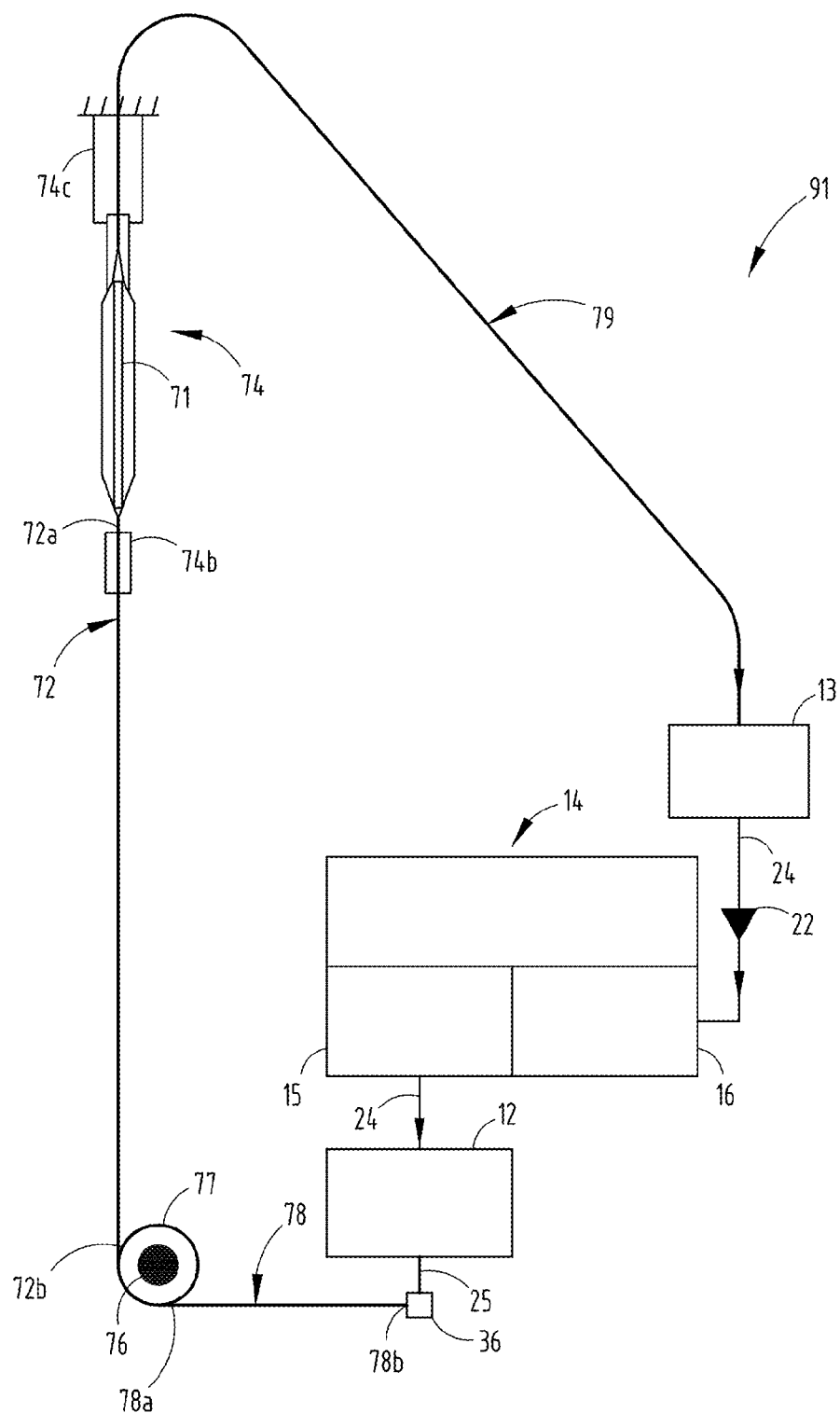
FIG. 1A is a schematic diagram illustrating the single path test configuration for testing the bandwidth of a multi-mode fiber as depicted in FIG. 1, modified at the detector end of the configuration according to another embodiment.
Figure 2A:
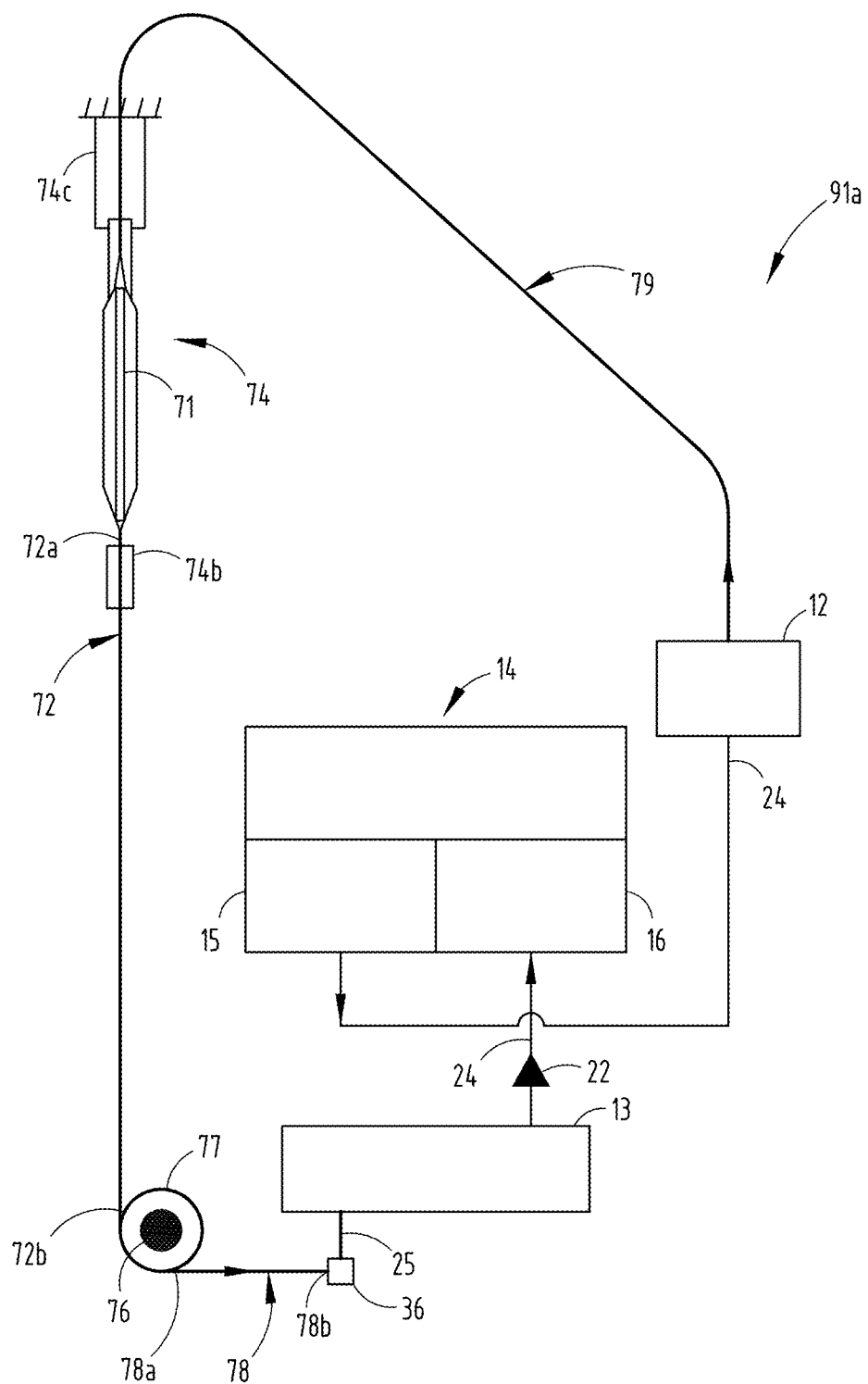
FIG. 2A is a schematic diagram illustrating the single path test configuration for testing the bandwidth of a multi-mode fiber as depicted in FIG. 2, modified at the transmitter end of the configuration according to another embodiment.

In yet another approach, configurations 91 and 91*a*, as shown in FIGS. 1A and 2A, rely on a hollow glass handle 74*c* fused at the top end of the preform 74 with bare fiber. The bare fiber passes through the hollow handle 74*c*. Further, the handle 74*c* is mounted on a draw tower (not shown) with a spliced pigtail fiber attached to the bare fiber. The bare fiber and spliced pigtail fiber serve as the test fiber 79. As such, test fiber 79 is looped through the top of the draw tower, down to the floor (not shown), and then connected to detector 13 (see FIG. 1A) or transmitter 12 (see FIG. 2A). In all other respects, configurations 91 and 91*a* operate and are configured comparably to the configurations 90 and 90*a* depicted in FIGS. 1 and 2.

There are other ways to conduct the online fiber MMF bandwidth measurement using a single pass configuration similar to those depicted in FIGS. 1, 1A, 2 and 2A. In one embodiment (not shown), the transmitter 12 can be coupled to the preform 74 such that incident light can be placed directly through a polished surface in the preform 74, and then into optical fiber 72. In another approach (not shown), it is possible to direct incident light from transmitter 12 into the side of the preform 74 at an angle, and then into optical fiber 72 for testing purposes.

Various incident light launch conditions can be employed in configurations 90 and 90*a* (and configurations 91 and 91*a*) using transmitter 12. In test configuration 90, the transmitter 12 is connected to the optical fiber 72 under test via a fiber connector 25 at the second end 78*b* of test fiber 78 (see FIG. 1). As described earlier, test fiber 78 is connected to optical fiber 72 via the rotating optical coupler within spool 76. In test configuration 90*a*, transmitter 12 is directly connected to the test fiber 79 (see FIG. 2). Since the transmitter 12 is VCSEL-based, most of the light launched into the test fiber 78 or the test fiber 79, and then on to optical fiber 72, is directed through the center region of the fiber. When a sufficient number of modes have been excited, the measured spectrum response curve is quite close to a Gaussian shape, comparable to the shape of the spectra observed from testing fibers using the configurations shown in FIGS. 1 and 2. In other circumstances, it may be necessary to test optical fiber 72 with different incident light launch conditions from transmitter 12, such as an overfill launch condition. The incident light launch conditions used by transmitter 12 can be modified by the use of different VCSEL-based light sources with certain characteristics. For example, transmitter 12 may employ a VCSEL that generates a high incident light intensity near the center of the optical fiber 72 (hot inside), a VCSEL that generates a high incident light intensity near the outside diameter of the optical fiber 72 (hot outside), or another VCSEL variant producing a combination of these patterns or other patterns.

Another approach to varying the incident light launch conditions through transmitter 12 is to insert a launch condition control unit (not shown) after the transmitter 12 in the configurations depicted in FIGS. 1 and 2. These control units have an engineered lens system to ensure that the spot size of the incident, test light signal on the optical fiber 72 can be toggled between a center launch and an overfill launch condition, while maintaining the required numerical aperture. The launch control unit should also be able to change the offset angle of the incident light into the optical fiber 72 for the creation of different mixtures and combinations of launch modes within optical fiber 72.

Figure 3:
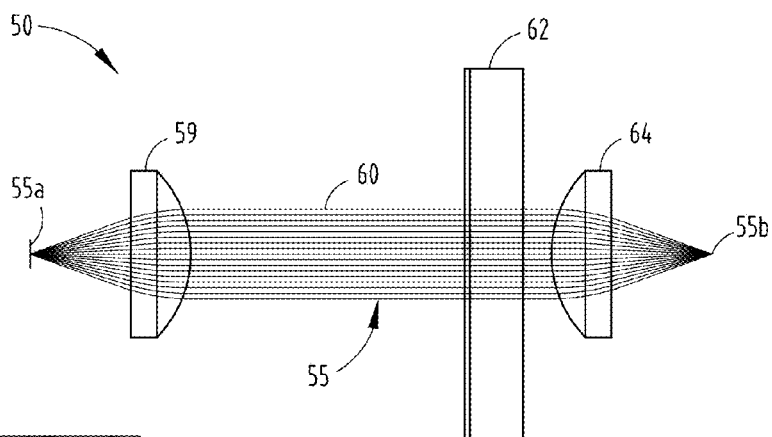
FIG. 3 is a schematic diagram of a mode converter assembly employed in the test configuration according to one embodiment.

To over-fill all possible modes in the optical fiber 72 tested in configurations 90 and 90*a* (see FIGS. 1 and 2), a single-mode beam from the light source in transmitter 12 can be converted into a multi-mode optical signal. As shown in FIG. 3, this conversion can be achieved by a mode converter assembly 50. The mode converter assembly 50 may be configured at either end of the fiber connector 25, which connects the transmitter 12 to the coupler 36 in the test configuration 90 (see FIG. 1). Mode converter assembly 50 may also be configured at the end of the test fiber 79 emanating from the transmitter 12 in the test configuration 90*a* (see FIG. 2). Mode converter assembly 50 may also be placed in other locations within the MMF bandwidth testing configurations to accomplish the same or a similar function in the course of measuring MMF bandwidth during fiber processing.

As further shown in FIG. 3, mode converter assembly 50 includes an input end 55*a* and an output end 55*b*, along with collimation lens 59 and optical lens 64. A special optical element, mode converter filter 62, is arranged between lenses 59 and 64. Mode converter filter 62 possesses a particular microstructure on its surface that redirects the input light beam from 55*a* (originating from transmitter 12) by changing the phase of each segment of the beam. The microstructure on the surface of filter 62 includes scatter-center units 63 that direct incoming light rays into different directions. The clustering of millions of scatter-center units 63 over a large area in the surface of filter 62 combines to provide the scattering properties of the mode converter filter 62.

Figure 4:
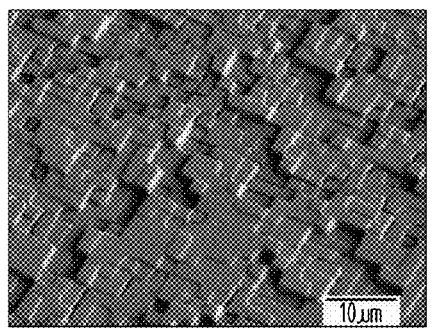
FIG. 4 is a scanning electrode micrograph of the surface of the mode converter filter depicted in FIG. 3.

The typical scatter-center unit 63 of filter 62 is a micro-lens element, as illustrated by the scanning electron micrograph in FIG. 4. To achieve greater than 90% conversion efficiency, each scatter-center unit depicted in FIG. 4 is individually designed to implement a certain light-control task. The surface structure as well as the statistical distribution of scatter-center units is carefully designed and fabricated within the mode converter filter 62. Alternatively, the scatter-center units 63 of filter 62 can be made of electro-optic elements with different refractive indices. Each element can be controlled by an electric signal. A typical example of such a device is a liquid crystal phase modulator 65. The modulator 65 can consist of a large number of transparent, small cells 66 filled with a solution of liquid crystal (LC) modules and function as an array of variable wave plates. Two parallel faces of the walls of each cell 66 can be coated with a transparent conductive film so that a voltage can be applied across each cell 66. The orientation of the LC molecules can be determined by an alignment layer in the absence of an applied voltage. When an AC voltage is applied, the molecules will change from their default orientation based on the applied root mean squared value of the voltage. Hence, the phase offset in a linearly polarized beam of light can be actively controlled by varying the applied voltage.

Figure 5A:
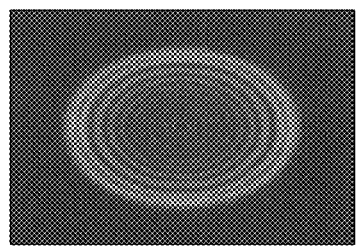
FIG. 5A is a simulated intensity profile in 2D of an incident circular beam converted by the mode converter assembly depicted in FIG. 3 into an elliptical beam.
Figure 5B:
FIG. 5B is an experimentally-generated intensity profile in 2D of an incident circular beam converted by the mode converter assembly depicted in FIG. 3 into an elliptical beam.
Figure 5C:
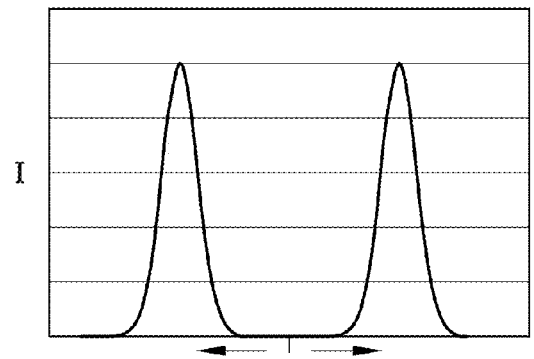
FIG. 5C is an experimentally-generated intensity profile as a function of fiber radius of an incident circular beam converted by the mode converter assembly depicted in FIG. 3 into an elliptical beam.

FIG. 5A provides a simulated intensity profile in 2D of an incident circular beam converted by the mode converter assembly 50 (as depicted in FIG. 3) into an elliptical beam. For example, the incident circular beam from a transmitter 12 employed in test configurations 90 and 90*a* (see FIGS. 1 and 2) may be converted to an elliptical beam, as demonstrated by the simulated profile shown in FIG. 5A. This effect is accomplished by the insertion of the mode converter assembly 50 as discussed earlier. In addition, experimental results from the use of a mode converter assembly 50 in a single-ended MMF bandwidth test configuration (see test configurations 70 and 70*a* depicted in FIGS. 14A & 14B, along with corresponding description below) are depicted in FIG. 5B. The elliptical profile observed in FIG. 5B is comparable to the simulated profile shown in FIG. 5A. Further, the plot of intensity versus radius of optical fiber 72 shown in FIG. 5C demonstrates the existence of intensity peaks toward the outer circumference of the fiber.

In particular, the converter assembly 50 redistributes power from the original, incident circular beam to the edge of the optical fiber 72, and the lenses then re-image the beam into an elliptical ring. In this case, the beam intensity profile is controlled by the mode converter filter 62 while the beam size is controlled by the lenses 59 and 64. As a result, using a mode converter assembly 50 in test configurations 90 and 90a (as shown in FIGS. 1 and 2) can change the power intensity without changing the beam shape. Further, changing the spacing between lenses 59 and 64 distance leads to different beam sizes without changing the beam intensity profile. In a test configuration comparable to the test configurations 90 and 90a depicted in FIGS. 1 and 2, a number of mode converter assemblies 50 with different profiles can be used. They can be mounted on a conventional, multi-filter holder, making them easy to swap without requiring realignment of the optical components.

In another embodiment, a spatial light modulator, such as a liquid crystal spatial light modulator (LC SLM), can be used to alter the mode conditions of the MMF or the light launch condition into the optical fiber 72 under test. The liquid crystal light modulator allows the user to alter the optical phase of each pixel of incident light. Referring to FIGS. 1 and 2, a single mode laser, such as a DFB laser, serves as transmitter 12 and is coupled to a polarization controller (not shown) that is connected to network analyzer 14. This polarization controller aligns the state of the polarization of the incident light going into a $LiNbO_3$ modulator (not shown). The output single mode light from transmitter 12 is converted into a collimated beam through a lens (not shown). The collimated beam then passes through the LC SLM and the phase of the light beam is spatially adjusted before being focused down into the receiving end of the optical fiber 72, e.g., via the second end 78b of test fiber 78 (FIG. 1) or test fiber 79 (FIG. 2). By manipulating the phase across the beam, the light intensity profile of the light launched into the MMF is adjusted. By changing the phase of the LC pixel, the light profile launched into the MMF can be altered as programmed by a computer. Alternatively, an LC SLM that operates in a reflective mode can be employed in this test configuration.

Under certain circumstances, the optical signals that reach the photo-detector 13 in the configurations 90 and 90a depicted in FIGS. 1 and 2 have a low intensity. Additional amplification schemes can be used to mitigate data detection problems associated with low beam intensity. For example, a one-stage electrical amplifier 22 may be introduced in the cabling 24 after the photo-detector 13 (see FIGS. 1 and 2). This amplifier can significantly boost the signal that reaches detector port 16 of the network analyzer 14.

For example, the CSI V226 transmitter employed as transmitter 12 in experiments conducted using the test configurations depicted in FIGS. 1 and 2 has 4 dBm optical power at 850 nm. By adding a one-stage electrical amplifier 22 after a Newport detector (e.g., detector 13) to the test configuration, bandwidth measurements can still be made for a 1 km MMF after around 30 dB of optical attenuation through a variable optical attenuator (VOA) (not shown) inserted just before the photo-detector 13 (e.g., at the end of the test fiber 79 in test configuration 90; and the second end 78b of the test fiber 78 in test configuration 90a).

The test configurations 90 and 90a depicted in FIGS. 1 and 2 were also evaluated using a Gennum, Inc. receiver optical sub-assembly (ROSA) for photo-detector 13. The Gennum ROSA includes a built-in limiting amplifier. Note that the limiting amplifier has a nonlinear response when the light signal level is high, but behaves linearly when the signal level is low. Further, accurate bandwidth measurements could be made using a CSI V226 transmitter for transmitter 12, even when the optical attenuation reached as high as 45 dB. The use of these testing configurations allows up to around 40 dB of loss budget. Even with 40 dB of overall optical loss from the MMF and a connector, or a purposely introduced VOA, a measurement that yields a meaningful bandwidth result can be made for the MMF.

In another embodiment, it is also feasible to further boost the incident light signal from transmitter 12 by using an optical amplifier operating around 850 nm (not shown). Such devices are commercially available with 10 dB or greater gain when used in collaboration with single-mode light sources. The use of an optical amplifier in test configurations 90 or 90a after the transmitter 12 requires the selection of a single-mode VCSEL or a single mode DFB laser for the transmitter 12. An optical amplifier may be used in combination with a one-stage electric amplifier 22 to mitigate a high degree of optical signal loss during single-ended, MMF bandwidth testing.

A few practical factors should be considered in making bandwidth measurements on an MMF, e.g., optical fiber 72, while its length increases during testing. First, the online measurement (i.e., during processing of the MMF) is performed when the optical fiber 72 is being drawn during production. Typical draw speed is on the order of 10 s of m/s during production (e.g., 40 m/s) and each frequency response measurement is taken within approximately 0.1-1.0 s. It is also possible to test optical fiber 72 during drawing at a slower-than-production speed (e.g., 1 m/s). Consequently, the fiber length may be changed by several meters during each frequency response measurement. However, the fact that the MMF extends several meters during each frequency response measurement has minimal impact on the total fiber bandwidth value obtained from a total test fiber length (e.g., total length of optical fiber 72) of at least 300 m and to up to 10-20 km. More specifically, fiber movement and fiber length changes during the measurement can cause overall changes and local fluctuations to the spectrum curve. Yet, this effect is typically within a small range and does not severely affect the data quality for obtaining bandwidth associated with optical MMFs, such as optical fiber 72. Additional data smoothing and averaging can further be conducted to improve the measurement accuracy and consistency.

A second factor in making online bandwidth measurements according to the embodiments depicted in FIGS. 1 and 2 is the fiber attenuation exhibited during the bandwidth testing of optical fiber 72. Approximately 2.2 dB/km of attenuation can exist according to today's MMF specifications at an incident test light signal wavelength of 850 nm. Since these bandwidth tests are conducted with a single path condition using configurations 90 and 90a, the test signal light passes each portion of the fiber once. Accordingly, each km of multi-mode fiber length may contribute around 2.2 dB of signal loss during the test. This may be a limiting factor on the overall fiber length that can be tested, as eventually the test signal losses could be too high to obtain meaningful testing data.

Experiments have been conducted to evaluate the combined loss from the hot zone and the light running through the preform at a draw speed of essentially zero. The total optical loss from these components under certain process conditions could be as high as 18-20 dB. When drawing the optical fiber 72 at typical draw speeds, an additional 20-22 dB of optical loss can potentially be observed. This is due to the length of optical fiber emerging from the preform at a high temperature. Together, the two losses can be on the order of 40 dB, which could consume the entire optical budget. To make the online bandwidth measurements more useful in practice, the overall optical loss should be reduced. A cooling device (e.g., cooling device 74b) that reduces the freshly drawn fiber temperature by 100-400° C. can be used to reduce the overall optical loss.

Experiments have demonstrated that the use of a combination of cooling and drawing the fiber (e.g., optical fiber 72) at a slower speed, for example <10 m/s, provides an overall reduction in system optical loss during online MMF bandwidth measurements. The use of these approaches has allowed for bandwidth measurements on 4 km of fiber. Further improvements are possible with the use of a Gennum ROSA for photo-detector 13, the CSI V226 transmitter for transmitter 12 and an additional fiber cooling device 74b placed at the bottom of the draw (e.g., in proximity to first end 72a of optical fiber 72).

Accordingly, it is feasible to measure an MMF online for over 7-10 km of fiber length at a wavelength of 850 nm. In addition, it is known that radiation-related absorption effects are often less pronounced at higher incident light wavelengths. Consequently, the bandwidth of an MMF measured at another wavelength, such as 980 nm, 1060 nm, and 1310 nm, can be used to estimate the bandwidth of the MMF at 850 nm. Given the reduction in radiation-related absorption effects at these higher wavelengths, it is possible to measure bandwidth of an MMF out to even longer fiber lengths.

Figure 6A:
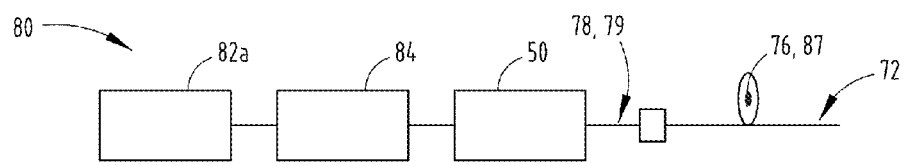
FIG. 6A is a schematic diagram illustrating a high-power light source assembly according to one embodiment.

On the other hand, as shown in FIG. 6A, a high-power light source assembly 80 can be employed in test configurations 90 and 90a for use within transmitter 12 (see FIGS. 1 and 2), delivering a higher optical power. A relatively straightforward way to increase the light source power is to deploy an optical amplifier before the signal launched into the optical fiber 72 under test. As shown, the light beam from a single-mode laser 82a (with signal modulation), such as a VCSEL, is amplified with a single mode amplifier 84 and the modulation frequency of the single mode laser 82a is controlled by a high frequency controller (not shown). The beam then passes through a mode converter assembly 50 (see FIGS. 3 and 4 and the corresponding description above) that converts the single mode beam into a multi-mode configuration, leaving all fiber modes in a state of excitation. The signal then travels into the optical fiber 72, via the test fiber 78 (see FIG. 1) or test fiber 79 (see FIG. 2). Further, high-power light source assembly 80 can be employed in test configuration 70 (see FIGS. 14A and 14B, along with the corresponding description below) after the transmitter 12, within the fiber connector 25, and before input port 35a.

Figure 6B:
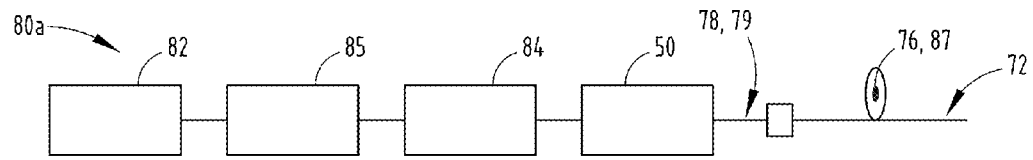
FIG. 6B is a schematic diagram illustrating a high-power light source assembly according to another embodiment.

FIG. 6B provides an alternative high-power light source assembly 80a. Here, the signal beam from a single mode laser 82, such as a VCSEL, passes through a fiber-based, optical modulator 85 which can achieve a high extinction on/off ratio at high frequencies (i.e., >10 GHz). As used herein, "extinction ratio" is the ratio of the ON signal to the OFF signal, often expressed in dB units. Then, the pulsed signal is amplified by a single mode amplifier 84 and launched into the MMF (e.g., optical fiber 72 via the test fiber 78 or test fiber 79, depending on the test configuration) after the mode converter assembly 50.

The benefit of using a single-mode laser 82, 82a, such as a single-mode VCSEL or a single mode DFB laser, is that it can greatly improve overall measurement performance. This is because a single-mode laser 82, 82a has a narrow spectral width and stable transverse mode distribution, ensuring that the link bandwidth does not include a substantial contribution from chromatic dispersion effects. However, these approaches depicted in FIGS. 6A and 6B can be modified by using a multi-mode VCSEL when cost and other aspects are more important than performance. As used herein, "link bandwidth" is the overall bandwidth (i.e., effective system bandwidth), incorporating contributions from modal bandwidth and chromatic dispersion effects.

The test configurations 90 and 90a depicted in FIGS. 1 and 2, respectively, directly measure the accumulated single trip bandwidth up to certain fiber length. The local or distributed fiber bandwidth is a direct measure of the fiber bandwidth property. This value can be determined in a couple of ways. Bandwidth measurements performed to date show that the spectrum curve exhibits a shape comparable in appearance to a Gaussian-shaped curve. The normalized Gaussian spectrum function may be represented by the following equation:

$$H(0,l,f) = e^{-f^2/(2\sigma_f^2)} \quad (1)$$

The fiber bandwidth (BW) may be determined as the frequency at the half-width at half maximum according to the following equation:

$$BW = (\tfrac{1}{2}) FWHM_f = \sigma_f \sqrt{2\ln 2} \quad (2)$$

As more fiber is drawn (e.g., as part of the optical fiber 72), the new fiber is considered as a concatenation of the fiber with length, l, at a previous moment and the newly drawn fiber up to the current moment with added length, Δl. The bandwidth of the two segments of the fiber are labeled as b(0,l) and b(l, l+Δl) respectively. For a uniform multi-mode fiber, the absolute bandwidth is determined by the bandwidth at 1 km (B) according to the following equation:

$$b(0,l) = B, l \quad (3)$$

However, when multi-mode mode fibers with different bandwidth properties are cascaded, it is important to assess how they should be added together. One way to link the bandwidth of different pieces together is to assume that they are totally independent of each other, comparable to cascading two Gaussian filters. Accordingly, the total bandwidth of the two segments of the fiber b(0, l+Δl) with total length of l+Δl may be determined by the following equation:

$$\frac{1}{b(0,l)^2} + \frac{1}{b(l,l+\Delta l)^2} = \frac{1}{b(0,l+\Delta l)^2} \quad (4)$$

The bandwidth of the newly drawn fiber with length of Δl between positions l and l+Δl may be represented by the following equation:

$$b(l+\Delta l) = \frac{1}{\sqrt{\dfrac{1}{b^2(0,l)} - \dfrac{1}{b^2(0,l+\Delta l)}}} = \frac{b(0,l)b(0,l+\Delta l)}{\sqrt{b^2(0,l) - b^2(0,l+\Delta l)}} \quad (5)$$

Equation (5) can be repeatedly applied over the increasing length of the optical fiber 72 to obtain the absolute bandwidth of each segment of fiber drawn with length Δl.

The bandwidth measurements from Equation (5) can now be scaled to a particular fiber length, e.g., 1 km. In an alternative embodiment, Equation (6) below can be used to generate a scaled bandwidth measure for an MMF such as optical fiber 72:

$$\frac{1}{b(0, l)} + \frac{1}{b(l, l + \Delta l)} = \frac{1}{b(0, l + \Delta l)} \quad (6)$$

Equation (6) is applicable to practical situations when the difference between one portion of the optical fiber 72 and another portion is relatively minor, which is the case for continuously drawn multi-mode fibers. Further, it is possible to use either Equation (4) or Equation (6) to determine the bandwidth of particular segments of the optical fiber 72, thus making distributed measurements.

The bandwidth of each segment of the optical fiber 72 from l to l+Δl can also be calculated using a different algorithm. The frequency response for optical fiber 72 from 0 to l is given as H(0, l, f). Accordingly, the frequency response from l to l+Δl may be given by the following equation:

$$H(l, l + \Delta l, f) = \frac{H(0, l\Delta l, f)}{H(0, l, f)} \quad (7)$$

In the units of dB, the spectrum for H(l, l+Δl, f) (dB) may be calculated from the following equation:

$$H(l,l+\Delta l,f) \text{ (dB)} = H(0,l+\Delta l,f) \text{ (dB)} - H(0,l,f) \text{ (dB)} \quad (8)$$

It should be appreciated that alternative definitions for obtaining a bandwidth value (e.g., at a 6 dB shoulder; 3 dB, non-Gaussian spectral shapes; or arc-bandwidth) exist and are often used as measures for MMF. These alternative definitions can be adapted according to the analysis above to derive similar bandwidth values as a function of length for use during draw processing of MMFs, such as optical fiber 72.

Example One

Test measurements were performed on MMFs using a test setup similar to the configuration 90 depicted in FIG. 1 and described above. An optical fiber preform (e.g., preform 74) was drawn to generate a small amount of bare fiber. The preform was subsequently cooled, flipped upside down, and then re-mounted on the draw tower (not shown), leaving the small amount of bare fiber at the top of the preform. The bare fiber was then routed over a support spool (e.g., support spool 87) and spliced with a pigtail fiber. Together, these fibers served as test fiber 79 (see FIG. 1). The test fiber 79 was then connected to a photo-detector (e.g., detector 13).

At this point, the preform was then subjected to additional fiber processing conditions and further fiber was drawn downward to form multi-mode optical fiber 72. The second end 72b of this newly drawn optical fiber 72 was connected to one end of rotating optical coupler within fiber spool 76. During processing, fiber 72 was wound over spool 76 to form coil 77. Additional optical fiber (e.g., test fiber 78) was also connected to the rotating optical coupler within spool 76, and one end of this fiber (e.g., second end 78b) was connected to a fiber coupler 36 as shown in FIG. 1. A fiber connector 25, routed from a VCSEL transmitter (e.g., transmitter 12), was then connected to the coupler 36. As such, the configuration shown in FIG. 1 was used to test newly-drawn optical fiber 72 that emanated from preform 74 (i.e., the fiber portion that includes coil 77 around spool 76 and includes the second end 72b connected to the rotating optical coupler within spool 76).

For ease of testing, optical fiber 72 was drawn at about 1 m/s, a slower-than-production level drawing speed. This made it easier to connect one end of the newly drawn fiber 72 (e.g., second end 72b) to the rotating optical coupler within spool 76 and the first end 78a of test fiber 78 during these measurements. About 5 km of fiber 72 was drawn as part of the testing procedure. Signals were transmitted into fiber 72 using the VCSEL with an overfill launch condition through the second end 78b of test fiber 78.

Figure 7:
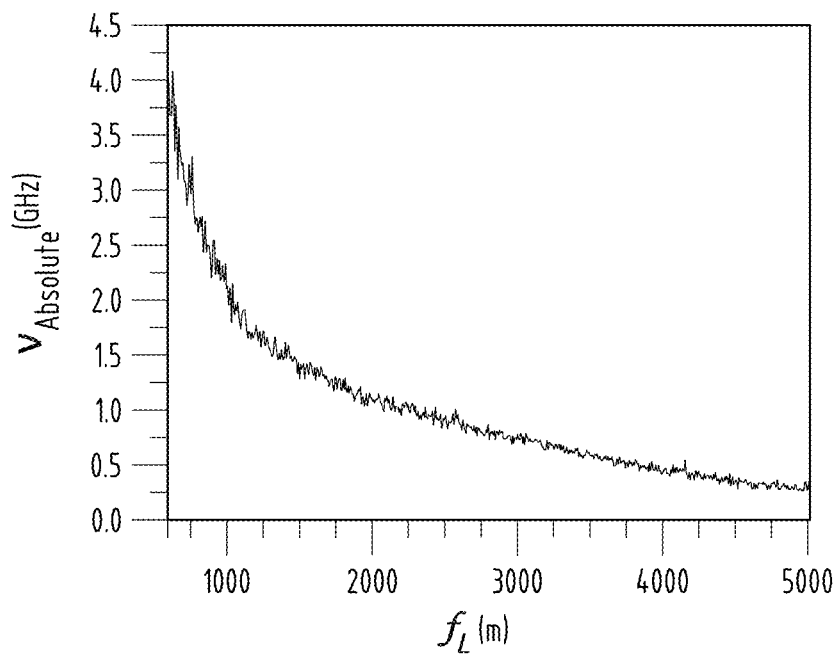
FIG. 7 is a plot of absolute bandwidth (GHz) as a function of fiber length (m) for a multi-mode optical fiber tested with a single path test configuration during processing of the fiber.
Figure 8:
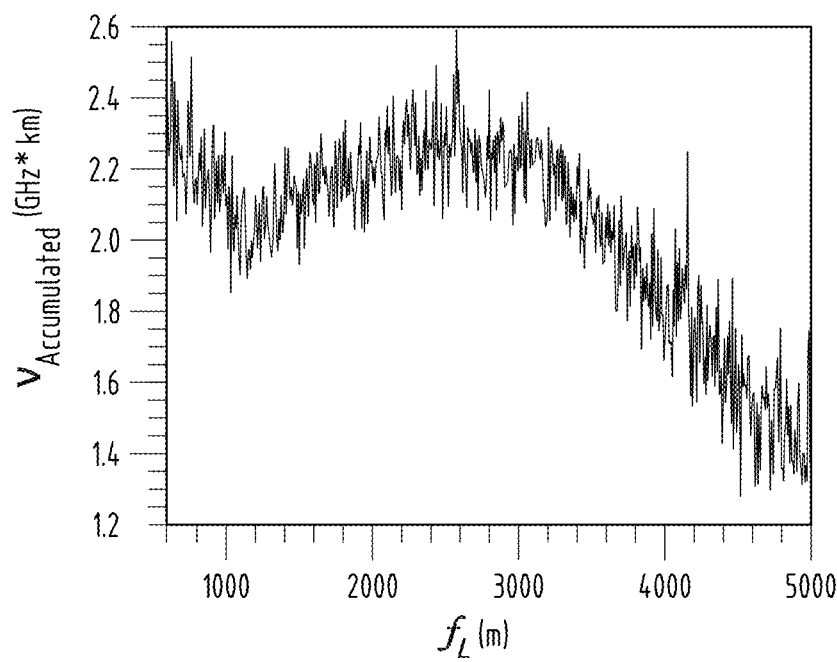
FIG. 8 is a plot of accumulated scaled bandwidth (GHz*km) as a function of fiber length (m) for a multi-mode optical fiber tested with a single path test configuration during processing of the fiber.
Figure 9:
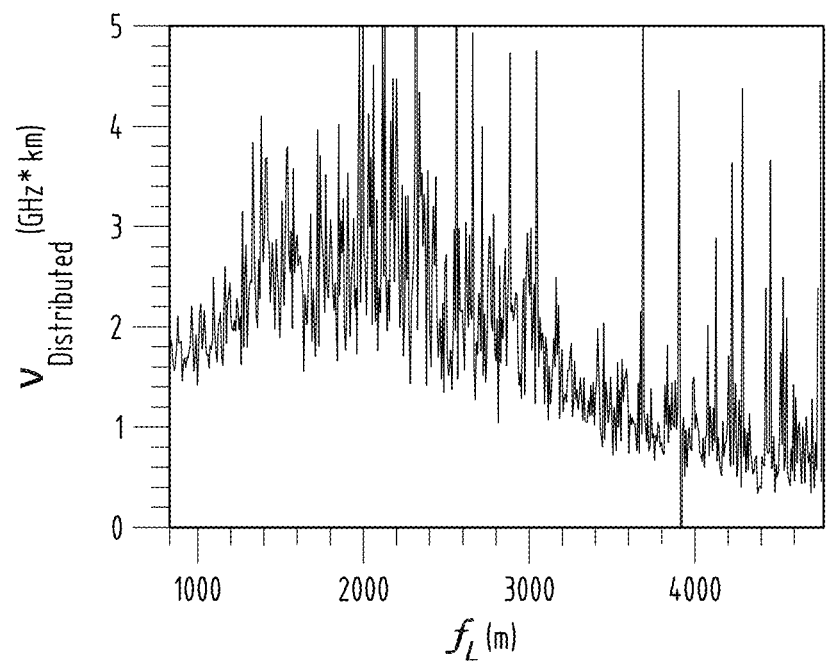
FIG. 9 is a plot of distributed scaled bandwidth (GHz*km) as a function of fiber length (m) for a multi-mode optical fiber tested with a single path test configuration during processing of the fiber.

The results from the testing are depicted in FIGS. 7 through 9. FIG. 7 depicts the overall absolute bandwidth, $\upsilon_{Absolute}$ (GHz), as a function of fiber length, $f_L$ (m), as more fiber is drawn during the course of testing. The overall bandwidth drops as the length of the optical fiber increases over time. In FIG. 8, the accumulated scaled bandwidth results, $\upsilon_{Accumulated}$ (GHz*km), are plotted as a function of fiber length, $f_L$ (m). As the chart demonstrates, the accumulated fiber bandwidth was not constant over the length of the optical fiber. To ascertain the contribution from each portion of the fiber, the results shown in FIG. 8 were converted to a distributed bandwidth as a function of fiber length using the equations discussed above. Accordingly, FIG. 9 shows the distributed bandwidth of the fiber, $\upsilon_{Distributed}$ (GHz*km), as a function of fiber length, $f_L$ (m). As FIG. 9 makes clear, the bandwidth first increases as the fiber length increases, and then the bandwidth drops as the length of the fiber exceeds 2 km. Accordingly, a fiber engineer could have used these measurements to adjust the fiber draw parameters, particularly as the fiber length exceeded 2 km. These fiber draw parameters could then be optimized to improve the overall bandwidth of the final MMF.

Example Two

Figure 10:
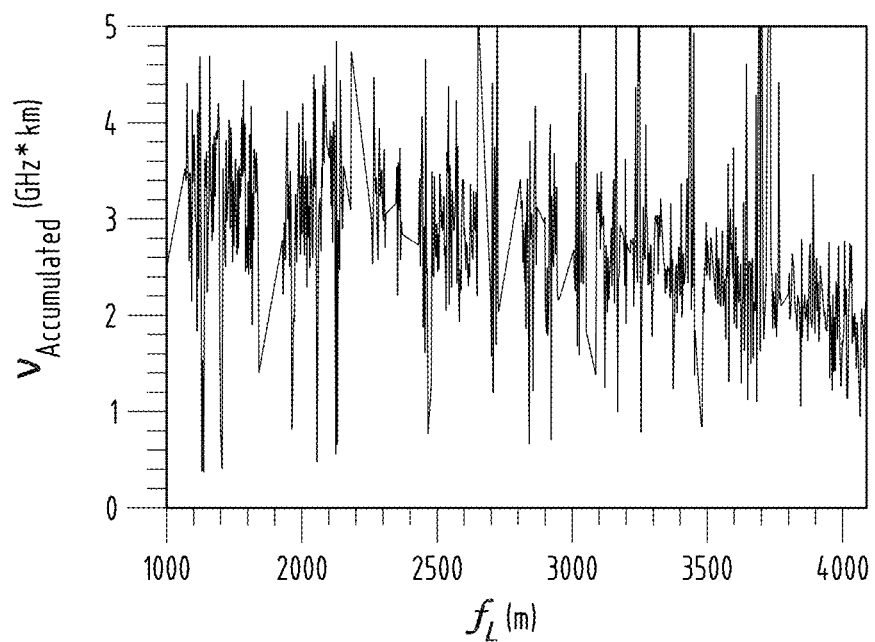
FIG. 10 is a plot of accumulated scaled bandwidth (GHz*km) as a function of fiber length (m) for a second multi-mode optical fiber tested with a single path test configuration during processing of the fiber.

An MMF fiber (e.g., fiber 72) was drawn and configured as described in the first example above. The fiber was drawn to a length of 4.09 km. Bandwidth measurements were made on the MMF and the results are depicted in FIG. 10. As shown, the accumulated scaled bandwidth results, $\nu_{Accumulated}$ (GHz*km) are plotted as a function of fiber length, $f_L$ (m). Using the equations described above, these results were converted to a total bandwidth measurement for the MMF of 0.45 GHz. The MMF fiber was then removed from the configuration and re-tested with a detector at one end and a transmitter at the other end. A bandwidth measurement of 0.47 GHz was obtained. This is in good agreement with the online measurement result, thus validating the online, single pass bandwidth testing configurations described herein (e.g., test configurations 90 and 90a).

Figure 11:
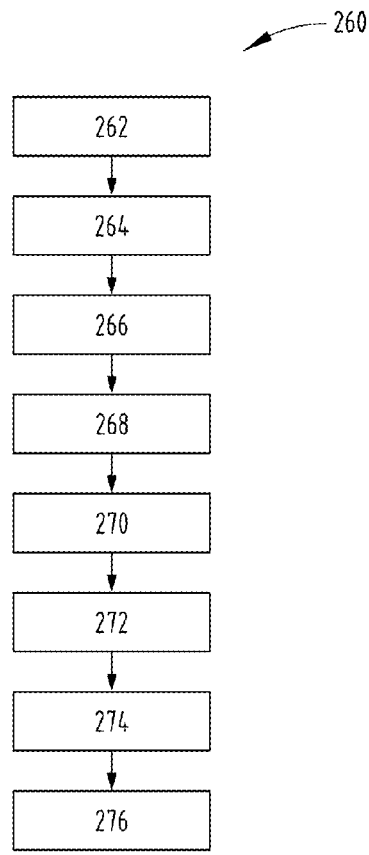
FIG. 11 is a flow chart of a method of testing the bandwidth of an optical multi-mode fiber with a single path test configuration and test signal originating on the draw end of the fiber according to one embodiment, such as depicted in FIG. 1.
Figure 12:
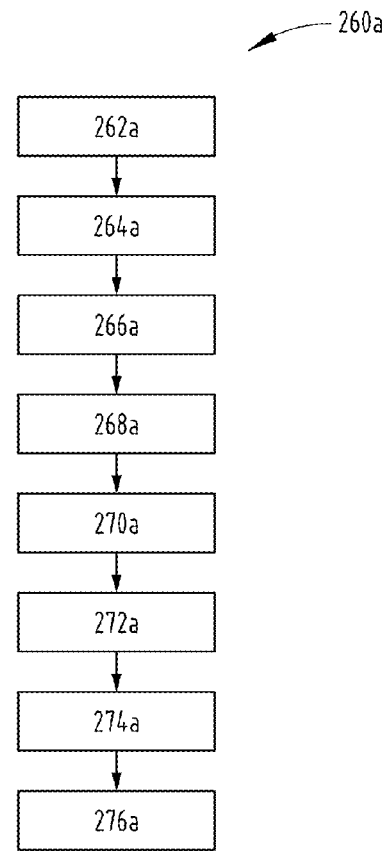
FIG. 12 is a flow chart of a method of testing the bandwidth of an optical multi-mode fiber with a single path test configuration and test signal originating on the preform end of the fiber according to one embodiment, such as depicted in FIG. 2.

FIGS. 11 and 12 each provide a flow chart of a method of testing the bandwidth of an optical multi-mode fiber online according to the single pass test configuration embodiments depicted in FIGS. 1 and 2, respectively. The single pass, online MMF bandwidth method 260 for test signal transmission via the one end (e.g., second end 72b) of the optical fiber (e.g., optical fiber 72) includes Steps 262 through 276 (see FIG. 11). Step 262 is for providing a multi-mode optical fiber (e.g., optical fiber 72 used in test configuration 90) with a first end 72a, a second end 72b, test fiber 78, and a test fiber 79. Step 264 is for transmitting a light signal (e.g., from transmitter 12) through the second end 78b of the test fiber 78, the coil 77, through the fiber 72, the preform 74, and then toward the test fiber 79. Step 266 is for receiving the transmitted portion of the light signal at the test fiber 79 (e.g., at photo detector 13). Step 268 relates to obtaining magnitude (i.e., electrical signal attenuation) and frequency data related to the received portion of the light signal at the test fiber 79 (e.g., at the photo-detector 13 and detector port 16 of a network analyzer 14).

Method 260 further includes Step 270 for analyzing the magnitude and the frequency data to determine an absolute bandwidth of the multi-mode optical fiber 72. As discussed earlier, the bandwidth of an optical MMF fiber tested in test configuration 90 reflects a single pass through the MMF, measured as the optical fiber 72 increases in length over time. Accordingly, Steps 272 and 274 are for calculating the absolute scaled bandwidth and distributed scaled fiber bandwidth, respectively, using the absolute bandwidth obtained in Step 270. Steps 272 through 274 can make use of Equations (1) through (8) above, for example. Finally, the method 260 ends with Step 276 for improving or modifying the conditions used to manufacture or otherwise process the MMFs based on the obtained bandwidth data. For example, the bandwidth data for a given MMF can be used to improve the processing conditions for subsequently-produced MMFs.

FIG. 12 also depicts a flow chart for a single pass, online MMF bandwidth method. The method 260a depicted in FIG. 12, however, is very similar to the method 260 depicted in FIG. 11. Here, method 260a corresponds to the test configuration 90a depicted in FIG. 2, i.e., for test signal transmission through optical fiber 72 via initial signal transmission through test fiber 79. Accordingly, Steps 264a and 266a in FIG. 12 are slightly different from the corresponding Steps 264 and 266 shown in FIG. 11. Step 264a is for transmitting a light signal (e.g., from transmitter 12) through the test fiber 79, through the preform 74, and into optical fiber 72 in proximity to first end 72a. The light signal then moves through fiber 72 toward the second end 72b, into coil 77, and then through test fiber 78. Step 266a is for receiving the transmitted portion of the light signal at the second end 78b of the test fiber 78 (e.g., at photo detector 13). Otherwise, the Steps in method 260a depicted in FIG. 12 are identical to the corresponding Steps of method 260 depicted in FIG. 11.

The online bandwidth measurement results generated from testing optical fibers, such as optical fiber 72 according to configurations 90 and 90a shown in FIGS. 1 and 2, can be used as feedback for optimizing the process for manufacturing the MMFs. In particular, the results can be used for draw parameter control, including any of the following parameters: draw tension, draw temperature, fiber outer diameter, and draw speed. Through bandwidth feedback and continuous fiber process adjustments, the MMF bandwidth can be tuned into higher and more optimal values.

Figure 13:
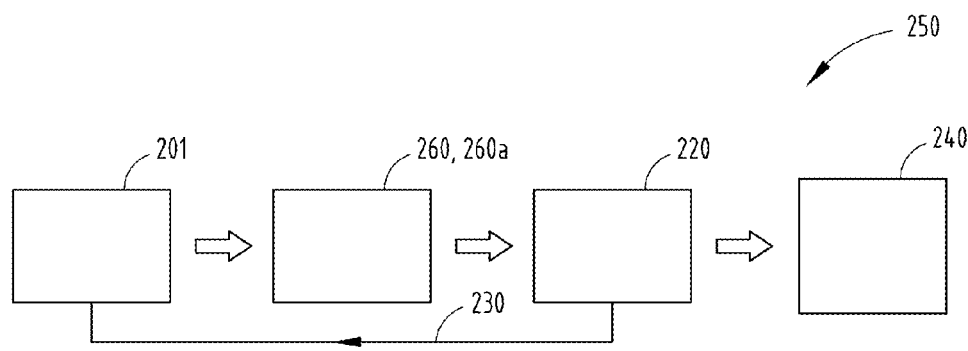
FIG. 13 is a flow chart depicting the optimization of a process for manufacturing multi-mode optical fibers based on testing the bandwidth of a multi-mode fiber during processing using a single path test configuration, such as depicted in FIGS. 1 and 2.

A flow chart provided in FIG. 13 illustrates the MMF draw optimization process 250. An MMF is first drawn according to Step 201 with a given length. Bandwidth measurements are made online according to Steps 260 or 260a (comparable to the Methods 260 and 260a outlined in FIGS. 11 and 12, and the corresponding description above) during the processing of the MMF. These bandwidth results are then used in Step 220 as a vehicle for providing feedback 230 for the fiber drawing process in Step 201.

The goal of the draw parameter tuning in Step 220 is to slow down the deterioration of the absolute bandwidth as compared to that set by the average bandwidth. This approach is employed rather than focusing on the overall bandwidth over a longer length for optical fiber 72. Equation (6) can be particularly helpful for providing feedback. Instead of using Equation (6) as a precise equation to figure out the bandwidth of newly drawn segments of the MMF, it can be used as a "measure of the bandwidth" of newly drawn fiber. In this way, Equation (6) provides the feedback for on-the-draw adjustments by helping drive the "measure of the bandwidth' as high as possible, exemplified by Step 240, as more fibers are drawn during processing.

Another aspect of calculating the 'distributed' bandwidth is that it is possible to slide a "window" through different locations of the optical fiber 72. This is done by obtaining the total bandwidth from the zero position to the end of the window, and the total bandwidth from the zero position to the beginning of the window. Accordingly, a smaller window of fiber can be assessed for bandwidth rather than measuring the local bandwidth number over several hundred meters of fiber length. By using the sliding "window," the distributed bandwidth can be measured more continuously and with more spatial resolution.

Figure 14A:
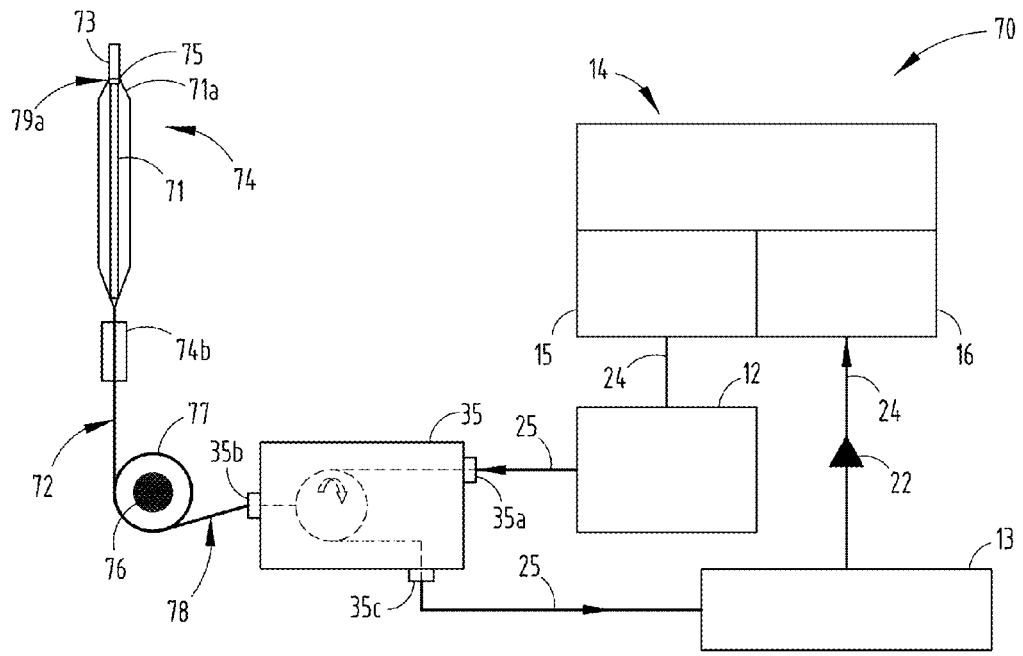
FIG. 14A is a schematic diagram illustrating a single-ended test configuration for testing the bandwidth of a multi-mode optical fiber during processing with a mirror at the second end of the fiber according to one embodiment.
Figure 14B:
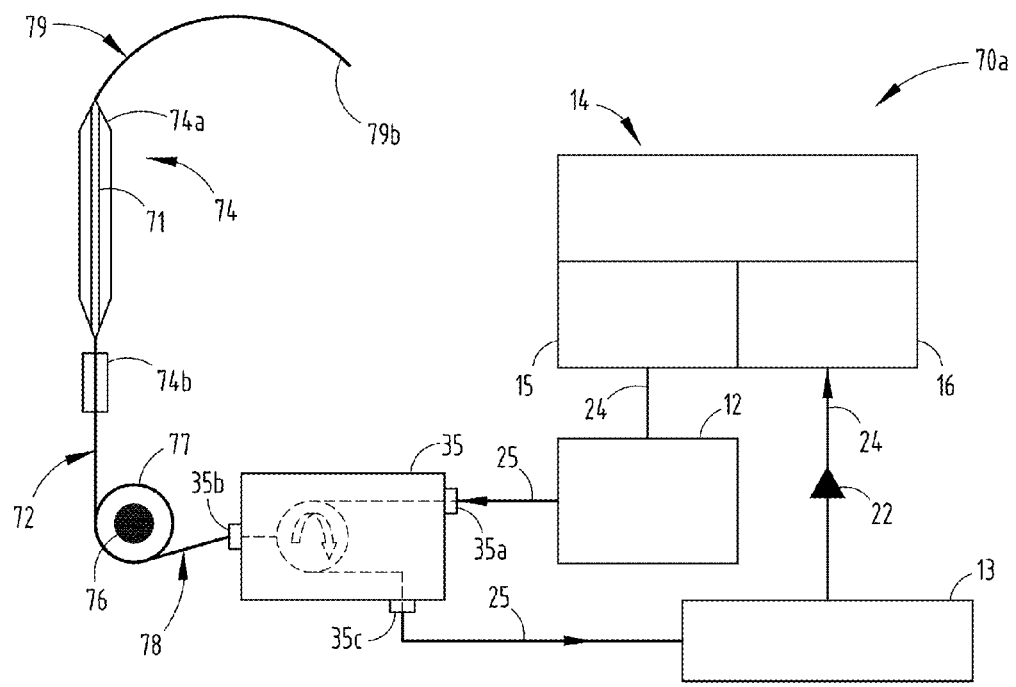
FIG. 14B is a schematic diagram illustrating a single-ended test configuration for testing the bandwidth of a multi-mode optical fiber during processing with a fiber light reflector at the second end of the fiber according to another embodiment.

FIGS. 14A and 14B provide two single-ended, test configurations 70 for testing the bandwidth of an MMF online (i.e., during fiber manufacturing or other processing). Similar to the test configurations 90 and 90a depicted in FIGS. 1 and 2, the test configurations 70 depicted in FIGS. 14A and 14B include fiber processing apparatus and the length of the MMF changes as a function of time. Note that the test configurations 70 and 70a as shown in FIGS. 14A and 14B, respectively, rely on an optical circulator 35 (described in further detail below). Nevertheless, a directional coupler, or other known technology that performs the required function, can be substituted for the circulator 35 in these configurations as described in further detail below.

One embodiment of a single-ended test configuration for measuring the bandwidth of an MMF online is depicted in FIG. 14A. In particular, FIG. 14A provides a single-ended test configuration 70 with an optical circulator 35 for testing the bandwidth of a multi-mode optical fiber 72. Unlike the embodiments depicted in FIGS. 1 and 2, test configuration 70 depicted in FIG. 14A relies on test signal transmission and receipt on only one end of the fiber 72.

FIG. 14A, in particular, provides a schematic layout of a method for measuring the bandwidth of an optical multi-mode fiber 72 in a single-ended configuration. As shown, multi-mode optical fiber 72 includes preform end 79a and is optically coupled to test fiber 78. The optical fiber 72 also includes a coil 77 wrapped around a fiber support spool 76. The fiber support spool 76 includes a rotating optical coupler (e.g., as taught in U.S. Pat. No. 7,746,454, incorporated by reference) that allows rotation of the spool 76 while eliminating or minimizing twisting effects of the fiber 72 during winding on spool 76 into coil 77 as the fiber 72 is processed (e.g., its length increases). Test fiber 78 is connected to optical fiber 72 via the rotating optical coupler within spool 76. In addition, a fiber cooling device 74b may be optionally arranged between the coil 77 and an end of the preform 74 (see FIG. 14A). As described earlier, the cooling device 74b can be tuned to reduce optical loss or radiation-related optical absorption effects associated with the high temperatures of the MMF at this location along the fiber 72.

The test fiber 78, connected to the fiber 72, is coupled to an analog transmitter 12 via an optical circulator 35. The preform end 79a of the fiber 72 is not connected to any components. As shown, the preform end 79a is encompassed within the glass preform 74 and core region 71. A glass handle 73 is located at the end of the core region 71. Further, a reflector 75 (e.g., a mirrored internal surface) is configured within a clear region 71a of the core region 71. Accordingly, the length of optical fiber 72 increases over time during processing as it is formed into coil 77 over fiber support spool 76. The various components used to extend the fiber 72 during processing into a long, MMF are known and not shown in FIG. 14A.

As further depicted in FIG. 14A, the network analyzer 14 provides a sweeping modulating signal to an analog transmitter 12 via cabling 24 connected to frequency modulation port 15 on the analyzer 14. The electric signal from the network analyzer 14 is converted into an optical signal through the analog transmitter 12. The optical signal is then launched by the transmitter 12 into a fiber connector 25, coupled to the input port 35a of the optical circulator 35. Optical circulator 35 then directs the optical signal through receiving port 35b, coupled to the test fiber 78, which is itself connected to the fiber 72. The optical signal then travels through the optical fiber 72 toward the preform end 79a. There, a portion of the incident light is reflected within the fiber 72 back through the coil 77 toward the test fiber 78 and receiving port 35b.

In the embodiment depicted in FIG. 14A, the preform end 79a of the fiber 72 is engineered to provide the back-reflection aspect of the test configuration 70. Essentially, the incident light within fiber 72 is launched into the molten portion of the optical fiber 72 with no coating. The light then enters the core region 71 of the preform 74, and then continues toward the preform end 79a of the fiber 72. As the light travels through the core region 71 of preform 74, it remains in a guided form because the preform 74 acts as a waveguide. The light is then back-reflected at the preform end 79a of the fiber 72. For example, the preform end 79a of the fiber 72 may be configured with a reflector 75 (e.g., a mirrored internal surface) to ensure that a substantial percentage of the incident light will be back-reflected from the reflector 75 (see FIG. 14A). It is this back-reflected light that returns to the optical circulator 35 at the receiving port 35b. The Rayleigh scatter from the incident light within fiber 72 will also be back-scattered at the preform end 79a of the fiber 72, but this back-scattering is an order of magnitude lower in intensity compared to the back-reflected light from the end interface. Accordingly, the effects of Rayleigh scatter at the preform end 79a of fiber 72 are negligible.

In the embodiment depicted in FIG. 14B, however, the incident light back-reflection in the fiber 72 is accomplished with a different configuration, test configuration 70a. In all other respects, the test configuration 70a embodiment depicted in FIG. 14B is comparable to the configuration 70 depicted in FIG. 14A. As shown in FIG. 14B, preform 74 includes a tapered region 74a on the end of the preform 74 away from the first end 78 of the fiber 72. Emanating out of tapered region 74a is a test fiber 79 (coated or uncoated), attached to the optical fiber 72. This bare test fiber 79 terminates with a fiber light reflector 79b. The fiber light reflector 79b may consist of a cleaved plane, an optically, reflective material, such as gold, or another known, fiber reflector device. If a cleaved plane is selected for the fiber light reflector 79b, it should be cut or otherwise created such that it is oriented substantially normal to the longitudinal axis of bare test fiber 79. It should also be sufficiently smooth or polished to ensure back-reflection of some portion of the incident light (at least 4%). A cleaving tool as is known in the optical fiber industry may be employed to create the cleaved plane. In addition, optical fibers in certain applications (e.g., in buildings) already possess a cleaved end coupled to a connector that can serve as a cleaved plane.

For the embodiments 70 and 70a depicted in both FIGS. 14A and 14B, the back-reflected test signal is then received at receiving port 35b of the optical circulator 35. Optical circulator 35 then directs the back-reflected test signal through output port 35c to the photo-detector 13 via cabling 24. Detector 13 converts the back-reflected optical signal back into an electrical signal. The electrical signal is then transmitted through detector 13 via cabling 24 into the detector port 16 of the network analyzer 14. Network analyzer 14 then provides the spectrum magnitude versus frequency data obtained for optical fiber 72.

Still further, the mode converter assembly 50 described above may be employed within the test configurations 70 and 70a shown in FIGS. 14A and 14B, respectively. Mode converter assembly 50 may be configured at either end of the fiber connector 25, connecting the transmitter 12 to the input port 35a of the optical circulator 35 (or a directional coupler). Mode converter assembly 50 may also be configured between receiving port 35b of the optical circulator 35 and the test fiber 78 (itself connected to fiber 72).

The single-ended test configurations 70 and 70a depicted in FIGS. 14A and 14B can be used to make bandwidth measurements with an optical MMF 72. Note that the launched light passes each portion of the fiber 72 twice. In the first pass, the light travels from the test fiber 78 to the fiber 72, and then to the preform end 79a (FIG. 14A) or the fiber reflector 79b in test fiber 79 (FIG. 14B). In the second pass, the light is then reflected back through fiber 72 and then through test fiber 78. The measured bandwidth is the bandwidth over this round-trip condition, a trip length of at least two times the length of the fiber 72.

Figure 15:
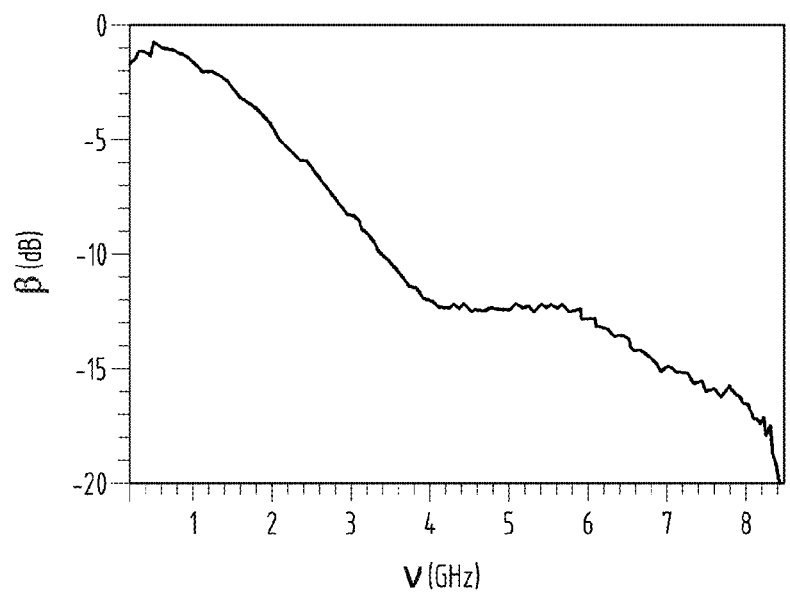
FIG. 15 is a plot of attenuation as a function of frequency for a test signal from a multi-mode optical fiber tested with a single-ended test configuration, such as depicted in FIGS. 14A and 14B.

Bandwidth measurements were made using an optical fiber 72 tested with a single-ended, offline (i.e., the MMF was removed from the production apparatus) test configuration, comparable to configurations 70 and 70a depicted in FIGS. 14A and 14B. The measured spectrum from these tests is shown in FIG. 15. Attenuation of the test signal, β (dB), is plotted as a function of test signal frequency, υ (GHz). Since MMFs are bandwidth-limited filters, when a higher frequency is used to modulate the transmitter (e.g., transmitter 12), the transmitted signal suffers from increasing attenuation or loss at higher frequencies. Typically, the measured spectrum of an MMF follows a Gaussian shape. Accordingly, the related bandwidth for an MMF, such as optical fiber 72 depicted in FIGS. 14A and 14B, can be readily retrieved through identifying the frequency when the attenuation reaches 3 dB (optical) or 6 dB (electrical) in the spectrum.

As shown in FIG. 15, the measured round-trip total bandwidth is the frequency in GHz (υ) corresponding to a 6 dB attenuation of the electrical test signal (β). The y-intercept is approximately—2 dB in FIG. 15; accordingly, the bandwidth corresponds to 3.1 GHz at an attenuation level of approximately—8 dB. The single-trip bandwidth ($b_{out}$ or $b_{return}$) is a function of the round-trip bandwidth ($b_{round\text{-}trip}$) according to Equation (9) below:

$$\frac{1}{b_{out}^2} + \frac{1}{b_{return}^2} = \frac{1}{b_{round\text{-}trip}^2} \qquad (9)$$

Since the bandwidth incurred at the outgoing trip ($b_{out}$) and the return trip ($b_{return}$) are equal to each other and the round trip bandwidth ($b_{round\text{-}trip}$) is measured, the outgoing bandwidth and return bandwidth is calculated at 4.4 GHz. This is the absolute bandwidth for an MMF, such as optical fiber 72, under test for the specific launch condition from the transmitter 12. When converted into a scaled bandwidth for a fiber length of 1 km, the measured bandwidth of the MMF tested and plotted in FIG. 15 is 1.13 GHz*km. This value is very close to bandwidth data collected on similar fibers using a conventional DMD measurement technique. This confirms the validity of the single-ended, bandwidth measurement configurations 70 and 70a depicted in FIGS. 14A and 14B, respectively.

Bandwidth testing of MMFs using the test configurations 70 and 70a shown in FIGS. 14A and 14B involves testing fiber 72 as the length of the fiber increases over time. Hence, the round-trip total bandwidth is measured over a period of time in which the length of the fiber 72 increases; accordingly, the measurement is influenced by this change in length.

Hence, the single-trip bandwidth ($b_{out}$ or $b_{return}$) is a function of the round-trip bandwidth ($b_{round\text{-}trip}$) according to Equation (9), as discussed above.

Figure 16:
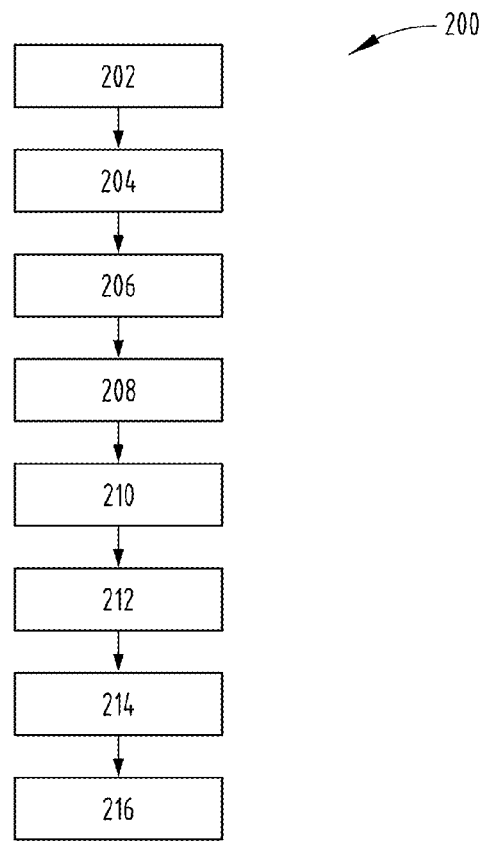
FIG. 16 is a flow chart of a method of testing the bandwidth of an optical multi-mode fiber during processing with a single-ended test configuration according to one embodiment, such as depicted in FIGS. 14A and 14B.

FIG. 16 provides a flow chart of a method of testing the bandwidth of an optical multi-mode fiber online according to the single-ended, test configurations 70 and 70a depicted in FIGS. 14A and 14B. As shown in FIG. 16, the single-ended, online MMF bandwidth method 200 includes steps 202 through 216. Step 202 is for providing a multi-mode optical fiber 72 (e.g., the optical fiber 72 used in test configurations 70 and 70a), and a test fiber 78. Step 202 is also for providing a preform end 79a of fiber 72 (test configuration 70) or a test fiber 79 with a fiber reflector 79b (test configuration 70a) that are configured to reflect light transmitted from the test fiber 78 of the fiber 72. Step 204 is for transmitting a light signal (e.g., from transmitter 12) through the test fiber 78 of the fiber 72 toward the preform end 79a of the fiber 72 (or toward fiber reflector 79b in test fiber 79), wherein a portion of the light signal is reflected by the preform end 79a (or fiber reflector 79b) toward the test fiber 78 of the fiber 72. Step 206 is for receiving the reflected portion of the light signal at the test fiber 78 of the fiber 72 at receiving port 35b of an optical circulator 35. Step 208 relates to obtaining magnitude (i.e., electrical signal attenuation) and frequency data related to the reflected portion of the light signal at the test fiber 78 of the fiber 72 (e.g., at the photo-detector 13 and detector port 16 of a network analyzer 14).

Method 200 further includes Step 210 for analyzing the magnitude and the frequency data to determine a bandwidth of the multi-mode optical fiber 72. As discussed earlier, the bandwidth of an optical MMF fiber tested in test configurations 70 and 70a reflects a round-trip through the MMF, over two times the length of the fiber. Accordingly, Steps 212 and 214 are for calculating the single-trip bandwidth and local fiber bandwidth using the round-trip bandwidth obtained in Step 210. Steps 212 and 214 can make use of Equations (1) through (9) above, for example. Finally, the method ends with Step 216 for improving or modifying the conditions used to manufacture or otherwise process the MMFs based on the obtained bandwidth data. As described earlier in connection with test configurations 90 and 90a, the bandwidth data for a given MMF tested with configurations 70 and 70a (i.e., as shown in FIGS. 14A and 14B) can be used to improve the processing conditions for subsequently-produced MMFs.

Figure 16A:
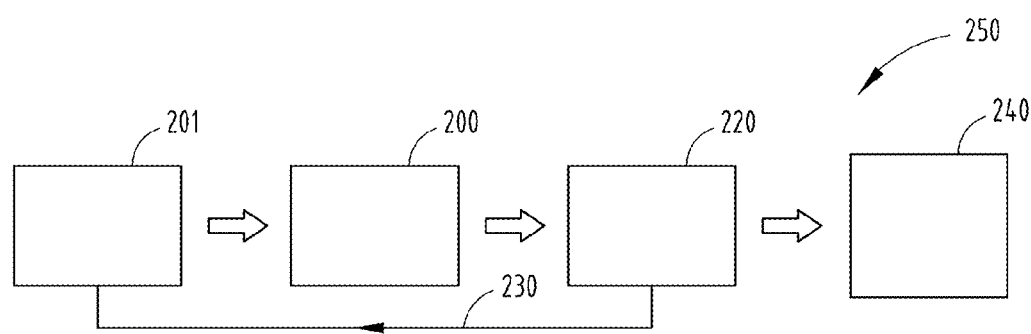
FIG. 16A is a flow chart depicting the optimization of a process for manufacturing multi-mode optical fibers based on testing the bandwidth of a multi-mode fiber during processing with a single-ended test configuration, such as depicted in FIGS. 14A and 14B.

A flow chart provided in FIG. 16A illustrates the MMF draw optimization process 250. An MMF is first drawn according to Step 201 with a given length. Bandwidth measurements are made online according to Step 200 (comparable to the Method 200 outlined in FIG. 16 and corresponding description) during the processing of the MMF. These bandwidth results are then used in Step 220 as a vehicle for feedback 230 for the fiber drawing process in Step 201. The optimization process depicted in FIG. 16A using test configurations 70 and 70a can be implemented in the same manner as shown in FIG. 13 using test configurations 90 and 90a in all other respects.

Figure 17:
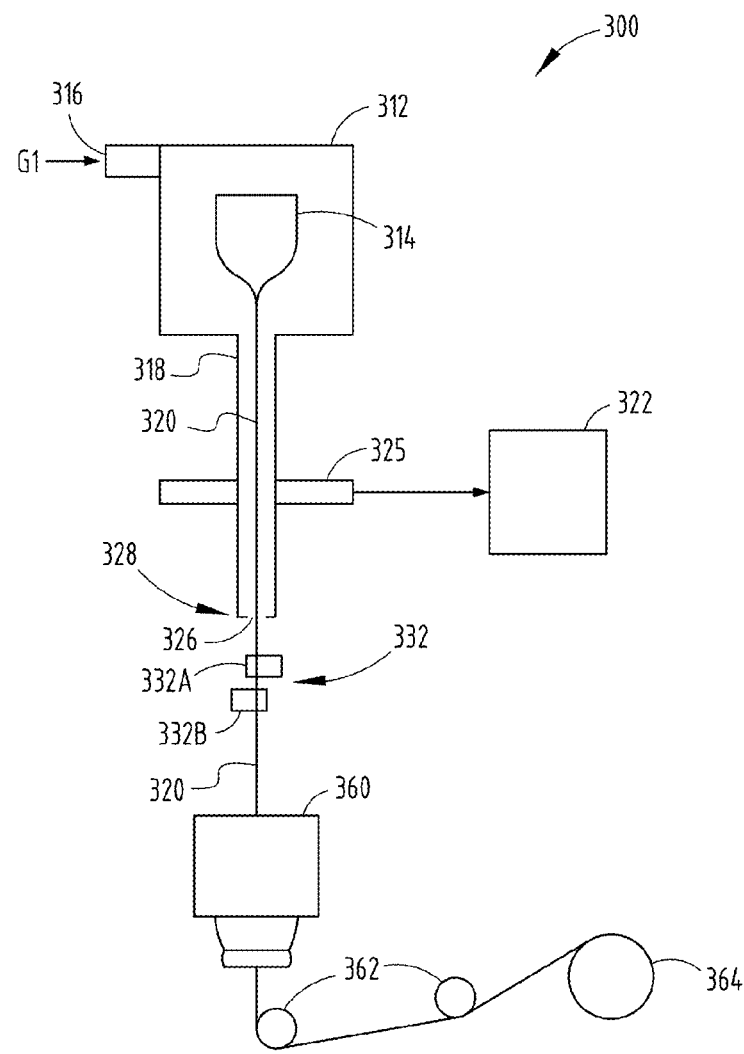
FIG. 17 is a schematic diagram illustrating an optical fiber production system employing a linear non-contact fiber centering device.

As shown in FIG. 17, an optical MMF production system 300 can be optimized using the online bandwidth measurements techniques and configurations discussed above (e.g., test configurations 70, 70a, 90 and 90a) for the production of MMFs. Here, MMF production system 300 employs a linear, non-contact fiber centering device. The details of such a system are disclosed in FIG. 1 of U.S. application Ser. No. 13/091,362, Publication No. US2011/0289980, and the corresponding description in its specification. This disclosure is incorporated by reference in this application. Also note that the optical fiber production system 10, furnace 12, etc. in FIG. 1 of U.S. application Ser. No. 13/091,362, Publication No. US2011/0289980, corresponds to the MMF production system 300, furnace 312, etc. in FIG. 17 of this application. Essentially, various optical fiber production systems, such as system 300 shown in FIG. 17, can be optimized for the production of MMFs using the single-pass and single-ended, online testing configurations and approaches discussed above.

Another consideration for the measurement systems described thus far is the high loss incurred by passing light through the fiber preform 74, where the glass taper(s) and high temperature erode the majority of the loss budget. Moreover, the single-ended measurements, e.g., test configurations 70 and 70a, incur additional loss by passing light through the optical fiber 72 and preform 74 twice.

Figure 18:
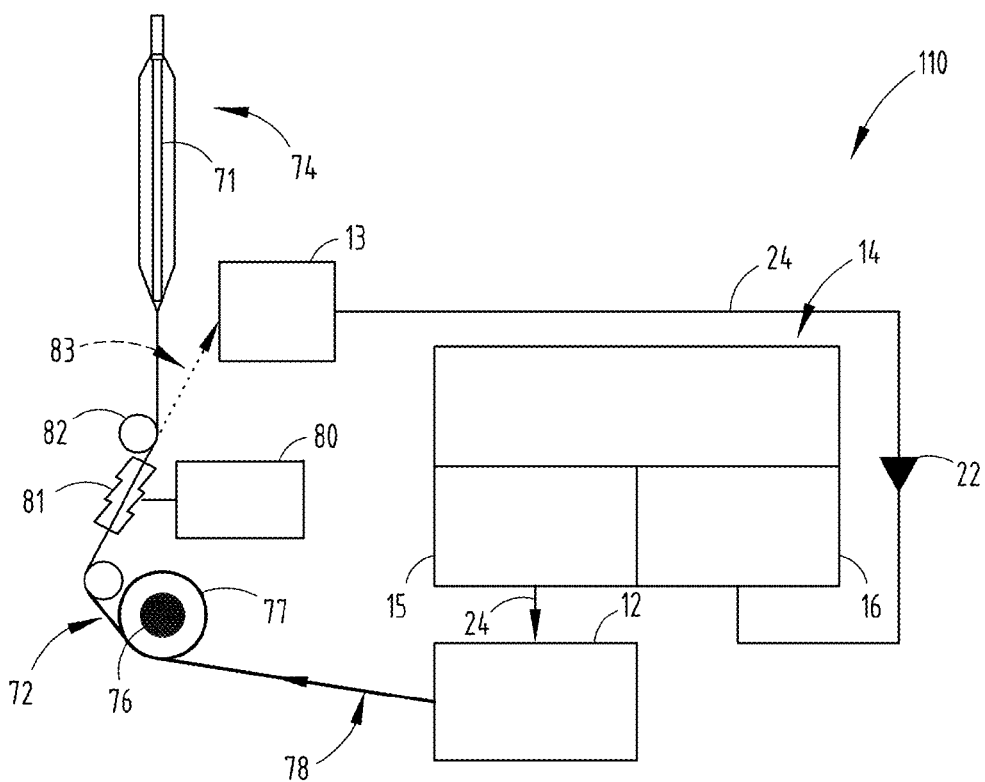
FIG. 18 is a schematic diagram illustrating a single-ended test configuration for testing the bandwidth of a multi-mode optical fiber during processing with a light extraction element below the glass preform according to a further embodiment.

FIG. 18 shows yet another embodiment of an on-draw measurement system using test configuration 110, a configuration similar to configuration 90 depicted in FIG. 1, but where the light is extracted from the optical fiber 72 below the glass preform 74 and directed to the detector 13. The light is extracted from the optical fiber 72 using extraction element 81, controlled by the extraction controller, 80. Some bending, such as provided by a pulley 82, can then force the light 83 extracted from the core of fiber 72 to leave the fiber 72 to strike the detector 13. By extracting the light below the preform 74, losses are minimized while utilizing the same measurement techniques described previously. With a ~40 dB optical loss budget, the losses would be minimized to essentially the 2.2 dB/km loss of the fiber and up to ~20 km of MMF can be measured.

Extracting light from bend-insensitive multi-mode fiber is not straightforward. Although the fiber (e.g., optical fiber 72) is designed to resist the loss resulting from bending, bending would be the typical method employed to extract light from the core in the forward direction. For this reason, the extraction element 81 is a device capable of coupling guided modes to cladding modes (across the bend-insensitive index trench) at which point a small amount of traditional macro-bending can successfully remove the out-coupled core light 83 from the fiber (e.g., optical fiber 72) to be directed onto the measurement detector 13. The mode coupling can be accomplished by forming a temporary long-period grating in the fiber 72. Such long-period gratings are known to couple modes in the forward direction of propagation within the fiber (i.e., measurement light is propagating from the fiber support spool 76 toward the glass preform 74).

For typical high-bandwidth, bend-insensitive multi-mode fiber index profiles, a calculation based upon the scalar wave equation can be performed to determine the required perturbation period (e.g. grating period) to couple guided mode light to the cladding. While there are many permutations of guided and cladding mode coupling possible (due to the large number of modes), it has been shown for MMF with alpha profiles that nearest neighbor coupling is often sufficient to equalize power among the modes very efficiently (i.e., move power from group to group) since the coupling period is nearly the same for all modes. This means that a grating with a period designed to achieve nearest-neighbor coupling should be sufficient to move significant power into the cladding for detection regardless of launched guided mode group. For typical bend-insensitive MMF, calculations show the required pitch (perturbation period) to be on the order of 1.1 mm for nearest neighbor coupling. Once light has been coupled from the guided to the cladding modes, it can be bent out of the optical fiber 72 to impinge on the detector 13.

While the nearest neighbor coupling is one possibility for coupling light out of the core into the cladding in preparation for detection, it should be noted that gratings or perturbations with other periods can accomplish the same task. This can be done by using higher-order coupling (coupling to modes 2, 3, . . . x groups away), which usually requires shorter grating periods or more complex grating structure. It is also known in the art that sub-harmonic coupling can also be employed, where grating periods are in fact longer than the nearest neighbor guided mode coupling periods. But a proper choice of perturbation shape and/or duty cycle can allow modes to couple.

Forming the long-period grating in the moving optical fiber 72 can be accomplished in various ways, including some non-contact methods. One such non-contact method would be an ultrasonic transducer that causes stress index variations in the optical fiber 72 with the appropriate spatial period (approximately a few millimeters) to form the appropriate long-period grating that will couple core and cladding modes in the forward propagation direction of the MMF. Another method compatible with moving fiber (e.g., optical fiber 72 with increasing length over time) is a corrugated pulley, where the corrugation period is again consistent with the spatial period required to couple light from the guided modes out into the cladding. Once the light is coupled from the core to the cladding region, a small radius bend such as that caused by a pulley 82 (see FIG. 18), can be used to remove the cladding light from the optical fiber 72 for detection. From this point, the signal is passed to the detector 13 and the measurement can proceed as described previously.

Figure 19:
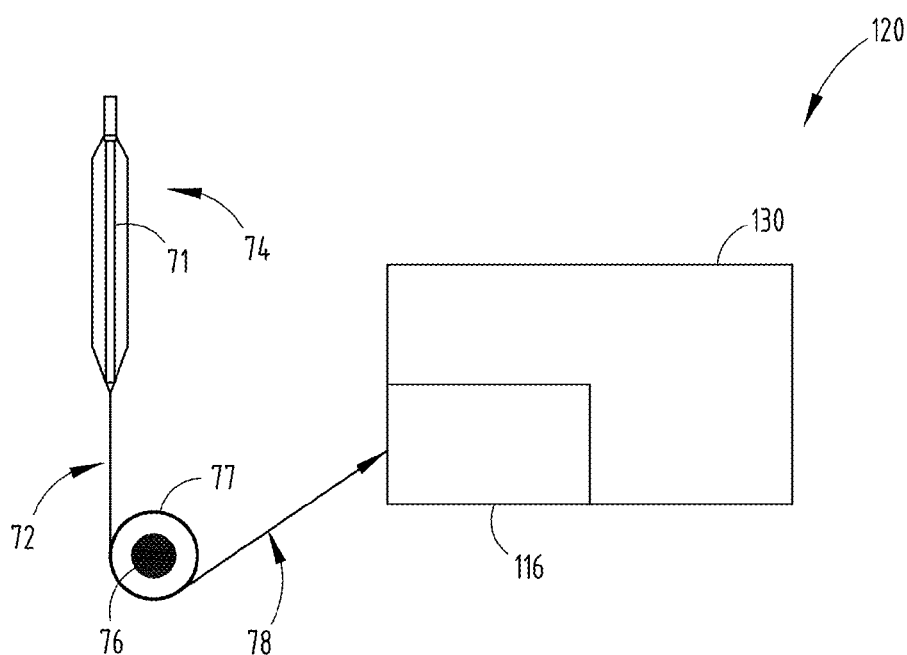
FIG. 19 is a schematic diagram illustrating the method of measuring loss by monitoring draw root radiation at the end of the drawn fiber reel through a rotating coupling according to an additional embodiment.

While much of the previous description above dealt with the measurement of MMF bandwidth, it should be understood that the concepts herein can be applied to other optical property measurements. One such example is signal loss. FIG. 19 is a schematic of a measurement configuration 120 wherein a test fiber 78, connected to an optical fiber 72, is connected to an optical detector port 116 of an optical spectrum analyzer 130. Because of the high temperature of the preform 74, significant blackbody radiation is coupled into the core of the fiber 72 as it is being drawn and wound as coil 77 over spool 76. This optical energy is sufficient to be detected by the spectrum analyzer 130 (at the connection between test fiber 78 and port 116). By analyzing the spectrum as a function of fiber length as described above, a simple subtraction of loss at length $l_2$ versus loss at length $l_1$ can be used in Equation (10) below to calculate loss per unit length:

$$\text{loss spectrum [dB/km]} = \frac{\text{loss}_2[\text{dB}] - \text{loss}_1[\text{dB}]}{l_2 - l_1} \quad (10)$$

Figure 20:
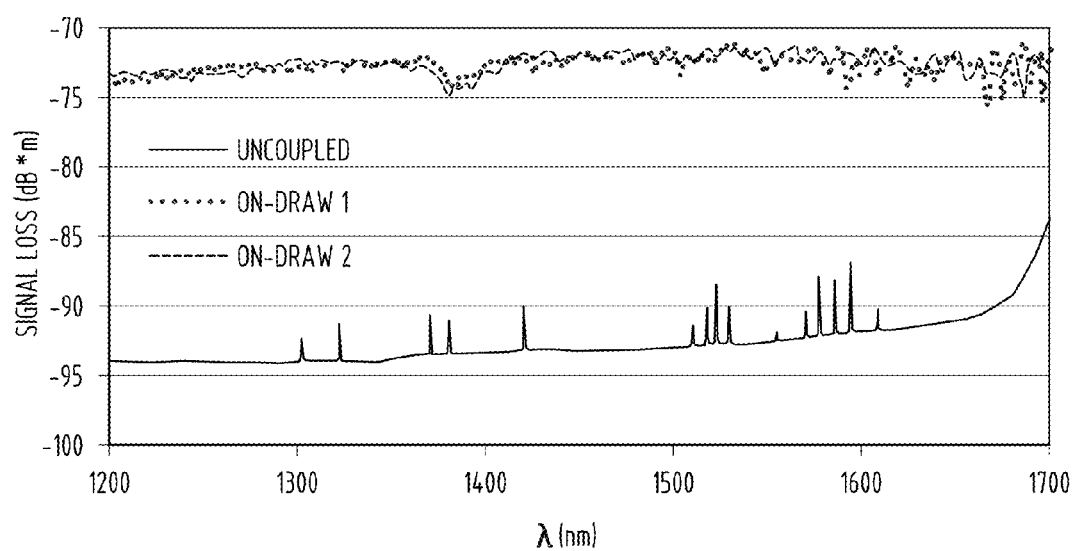
FIG. 20 is a plot showing an example of measured differences in optical spectrum when monitoring loss according to the configuration depicted in FIG. 19.

An example of the signal loss spectrum measured by an optical spectrum analyzer using light from the hot preform while the fiber is moving is shown in FIG. 20. In particular, the two "on-draw" traces in FIG. 20 reflect signal loss (dB*m) vs. wavelength, λ(nm), for fibers tested according to configuration 120 (see FIG. 19). The "uncoupled" trace reflects the signal loss trace measured by the test configuration when the fiber is not coupled to the configuration. Hence, the "uncoupled" trace reflects a noise baseline for the configuration.

Another optical property of interest is chromatic dispersion. The technique described in this disclosure is based on high-speed differential phase measurements of an intensity modulated light source that propagates through the fiber 72 under test. For an intensity modulated light source of wavelength, λ, the phase detected at the fiber output due to light propagation in a particular mode, ϕ, will be given by the following relationship in Equation (11) below:

$$\phi = \frac{2\pi f n_g}{c} \cdot EFL + \phi_0 \quad (11)$$

where f is the modulation frequency, $n_g$ is the group index of refraction at wavelength λ, c is the speed of light, and EFL is the effective fiber length.

For a fiber 72 that is growing in length as a function of time, the rate of change of the phase is given by Equation (12) below:

$$\frac{\partial \phi}{\partial t} = \frac{2\pi f n_g}{c} \cdot \frac{\partial EFL}{\partial t} = \frac{2\pi f n_g}{c} \cdot V \quad (12)$$

where V is the rate at which the fiber 72 changes in length. For a fiber 72 during drawing, V is the draw speed. Therefore, it is possible to calculate the instantaneous group index of refraction at the wavelength of the modulated source by measuring the rate of phase change and the draw speed. Equation (13) provides this group index as follows:

$$n_g = \frac{\partial \phi}{\partial t} \frac{c}{2\pi f V} \quad (13)$$

To determine the chromatic dispersion it is necessary to know the group index for the mode group of interest, $n_g$, at multiple wavelengths in order to calculate the difference in their relative group velocities. Therefore, at least two wavelengths must be used. If the additional wavelengths are modulated at slightly different frequencies they can be separated electronically instead of optically. This allows for the simultaneous use of the same high-speed detector. Moreover, as described above, a spatial light modulator or some other type of mode convertor can be used to selectively launch into the mode group of interest for the dispersion measurement, or an overfilled launch can be used to determine the overall MMF chromatic dispersion (all guided groups contributing). For two wavelengths, $\lambda_1$ and $\lambda_2$ (in nm), the chromatic dispersion (CD) at the wavelength, $(\lambda_1+\lambda_2)/2$, halfway between is governed by Equation (14) as follows:

$$CD\left(\frac{\text{ps}}{\text{nm} \cdot \text{km}}\right) = \frac{1}{c}\left[\frac{n_{\lambda 1} - n_{\lambda 2}}{\lambda_1 - \lambda_2}\right] = \frac{1}{3} \times 10^7 \text{ (ps/km)}\left[\frac{n_{\lambda 1} - n_{\lambda 2}}{\lambda_1 - \lambda_2}\right] \quad (14)$$

More wavelengths can be used to measure more CD points.

One should note that this measure of CD is derived from the rate of change in the effective fiber path length (e.g., the draw velocity when considering the fiber draw process) of optical fiber 72. As a result, the measured CD reflects the chromatic dispersion of only the growing (moving) portion of the waveguide. In other words, this is the growing portion's incremental contribution to the total waveguide dispersion.

One should further note that the techniques and configurations described above for launching and receiving the light at various points in the draw apparatus can be applied to the chromatic dispersion and other core property measurements.

It will be apparent to those skilled in the art that various modifications and variations can be made without departing from the spirit or scope of the claims.

What is claimed is:

1. A method of measuring a property of a multi-mode optical fiber during processing of the fiber, comprising the steps:
   drawing a multi-mode fiber from a draw end of an optical fiber preform in a manner that increases the length of the fiber as a function of time, wherein another end of said preform is optically coupled to a test fiber section;
   transmitting a light signal through one of the draw end or the test fiber section toward the other of the draw end or the test fiber section;
   receiving a portion of the light signal at the other of the draw end and the test fiber section;
   obtaining optical data related to the received portion of the light signal; and
   analyzing the optical data to determine a property of the multi-mode fiber.

2. The method according to claim 1, wherein the property is selected from the group consisting of bandwidth, attenuation, and dispersion.

3. The method according to claim 1, wherein the other end of said preform is optically coupled to a test fiber section via a length of fiber which was drawn from the other end of said preform prior to said drawing a multi-mode fiber step.

4. The method according to claim 1, further comprising the step:
   adjusting a fiber process parameter based at least in part on the determined property of the multi-mode fiber.

5. The method according to claim 1, further comprising the step:
   winding the multi-mode optical fiber over a spool having a rotating optical coupler to minimize at least one of testing artifacts and fiber damage caused by twisting of the multi-mode fiber during the step of drawing the multi-mode fiber.

6. The method according to claim 1, wherein the property is bandwidth and the optical data is magnitude of the light signal and frequency at a wavelength.

7. The method according to claim 6, wherein the bandwidth of the multi-mode fiber is calculated based at least in part on the length of the multi-mode fiber.

8. The method according to claim 6, wherein the step of transmitting a light signal comprises transmitting the light signal through the draw end of the multi-mode fiber toward the test fiber section, and the step of receiving a portion of the light signal comprises receiving the portion of the light signal at the test fiber section.

9. The method according to claim 6, wherein the step of transmitting a light signal comprises transmitting the light signal through the test fiber section toward the draw end of the multi-mode fiber, and the step of receiving a portion of the light signal comprises receiving the portion of the light signal at the draw end of the multi-mode fiber.

10. The method according to claim 8, wherein the bandwidth of the multi-mode fiber is calculated based at least in part on the length of the multi-mode fiber.

11. The method according to claim 10, further comprising the step:
    adjusting a fiber process parameter based at least in part on the bandwidth of the multimode fiber.

12. The method according to claim 9, wherein the bandwidth of the multi-mode fiber is calculated based at least in part on the length of the multi-mode fiber.

13. The method according to claim 12, further comprising the step:
    adjusting a fiber process parameter based at least in part on the calculated bandwidth of the multi-mode fiber.

14. A method of measuring a property of a multi-mode optical fiber during processing of the fiber, comprising the steps:
    drawing a length of multi-mode fiber from a preform in a manner that increases the length of the fiber as a function of time,
    transmitting a light signal through the multi-mode fiber into said preform and reflecting the light signal back through the multi-mode fiber;
    receiving at least a portion of the reflected light signal at a first end of the fiber;
    obtaining optical data related to the received light signal; and
    analyzing the optical data to determine a property of the multi-mode fiber.

15. The method according to claim 14, wherein a second end of the fiber is within the preform.

16. The method according to claim 14, wherein a second end of the fiber comprises a test fiber section coupled to the preform.

17. The method according to claim 14, wherein a second end of the multi-mode fiber is coated with an optically reflective material to reflect light transmitted from the first end of the multi-mode fiber.

18. The method according to claim 14, wherein the property is bandwidth and the optical data is magnitude of the light signal and frequency at a wavelength.

19. The method according to claim 18, wherein the bandwidth of the multi-mode fiber is calculated based at least in part on the length of the multi-mode fiber.

20. The method according to claim 18, further comprising the step:
    adjusting a fiber process parameter based at least in part on the determined bandwidth of the multi-mode fiber.

21. A method of measuring a property of a multi-mode optical fiber during processing of the fiber, comprising the steps:
    drawing a length of multi-mode fiber from an optical fiber preform in a manner that increases the length of the fiber as a function of time, the fiber having a first distal end and a second end;
    transmitting a light signal through the first end toward the second end of the fiber;
    extracting a portion of the light signal from the fiber at a point on the fiber in proximity to the second end;
    receiving the extracted portion of the light signal;
    obtaining optical data related to the received portion of the light signal; and
    analyzing the optical data to determine a property of the multi-mode fiber.

22. The method according to claim 21, wherein the property is bandwidth and the optical data is magnitude of the light signal and frequency at a wavelength.

23. The method according to claim 22, wherein the bandwidth of the multi-mode fiber is calculated based at least in part on the length of the multi-mode fiber.

24. The method according to claim 22, further comprising the step:
    adjusting a fiber process parameter based at least in part on the determined bandwidth of the multi-mode fiber.

25. A method of preparing a test configuration for measuring a property of a multi-mode optical fiber during processing of the fiber, comprising the steps;
    drawing a test fiber section in a downward direction to a defined length from a vertically oriented preform having a first and a second end, the test fiber section coupled to the first end of the preform;

cooling the preform;
rotating the preform such that the first end of the preform is substantially above the second end of the preform;
drawing a multi-mode optical fiber from the second end of the preform in a manner that increases the length of the optical fiber as a function of time, the optical fiber having a draw end;
transmitting a light signal through one of the draw end and the test fiber section toward the other of the draw end and the test fiber section;
receiving a portion of the light signal at the other of the draw end and the test fiber section;
obtaining optical data related to the received portion of the light signal; and
analyzing the optical data to determine a property of the multi-mode fiber.

* * * * *